July 31, 1956  R. T. WISE  2,756,696
MACHINE FOR MAKING WAFERS AND FORMING THEM INTO CONES
Filed Sept. 12 1952  9 Sheets-Sheet 1

INVENTOR
Robert T. Wise
BY Evans + McCoy
ATTORNEYS

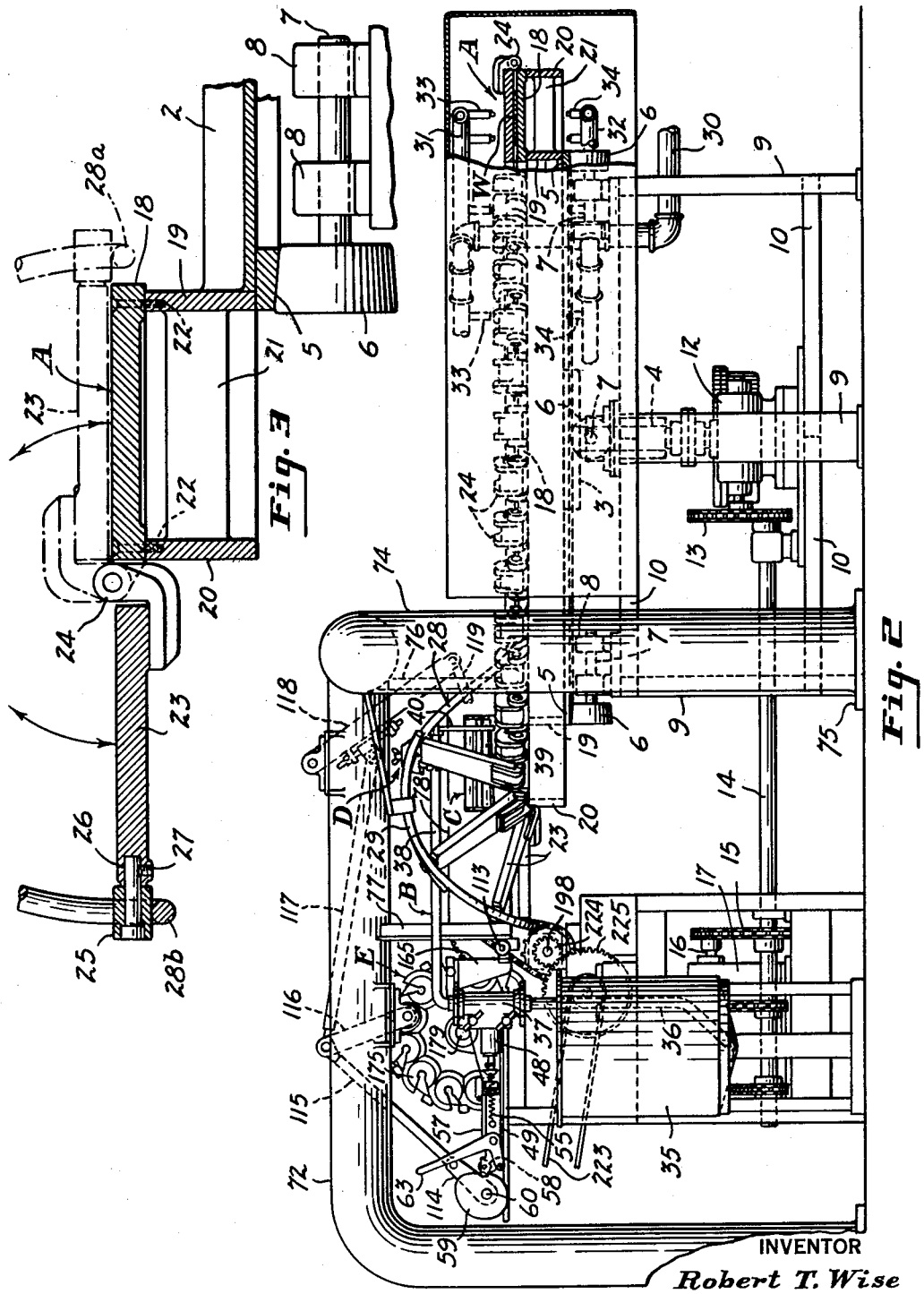

July 31, 1956  R. T. WISE  2,756,696
MACHINE FOR MAKING WAFERS AND FORMING THEM INTO CONES
Filed Sept. 12 1952  9 Sheets-Sheet 3
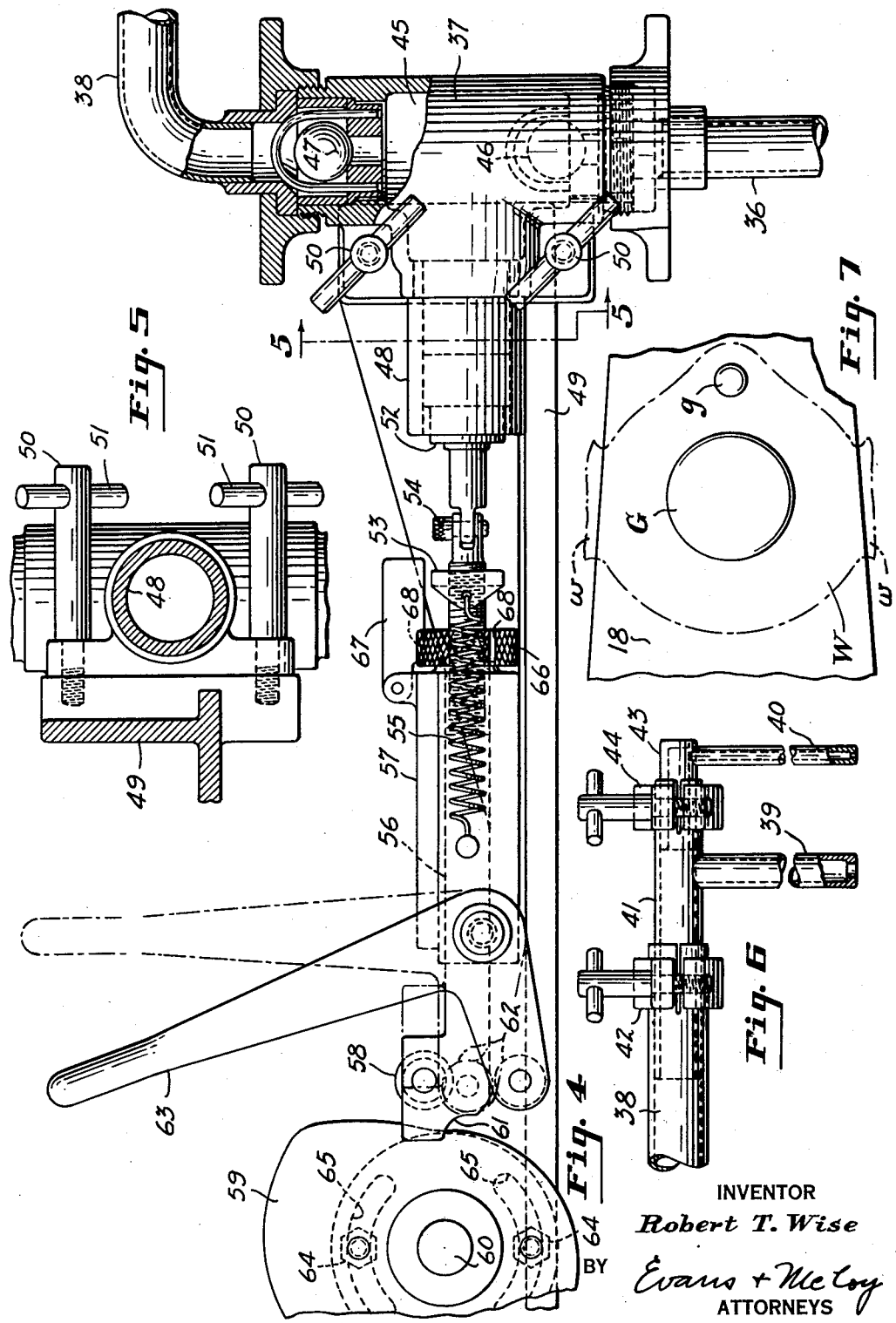
INVENTOR
Robert T. Wise
BY Evans + McCoy
ATTORNEYS

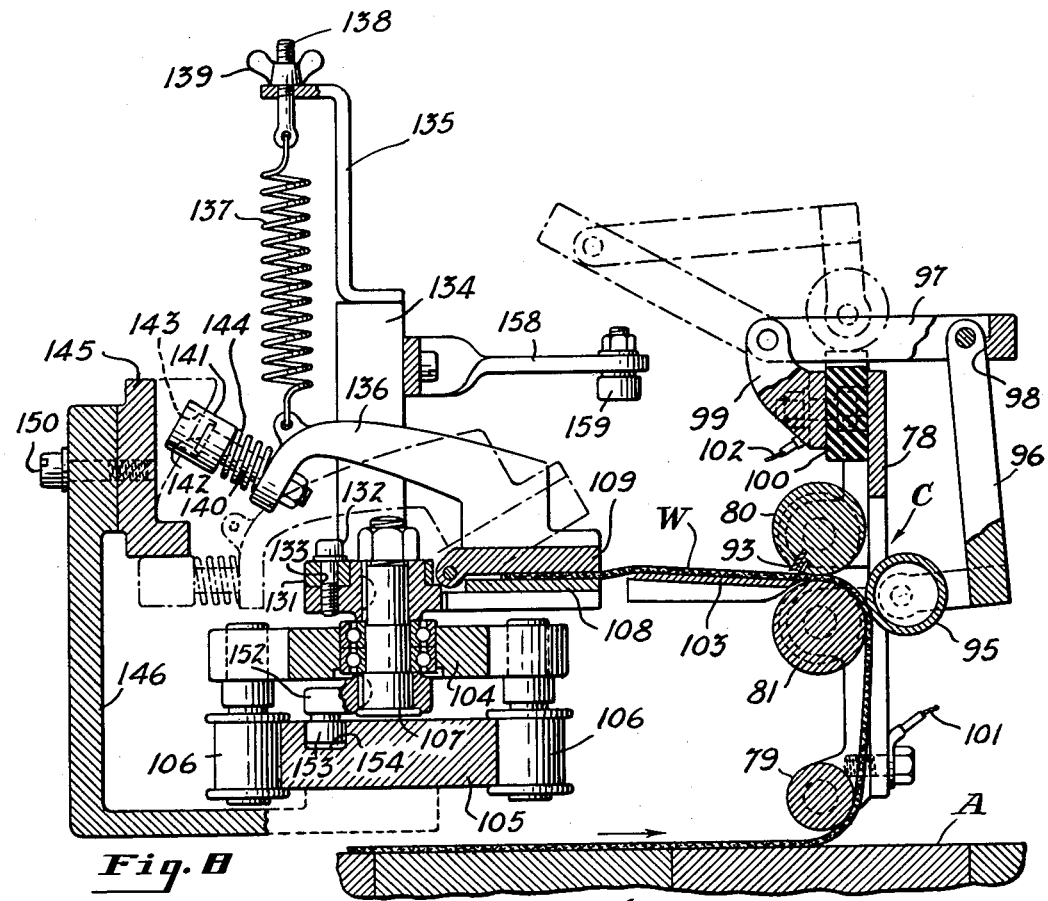
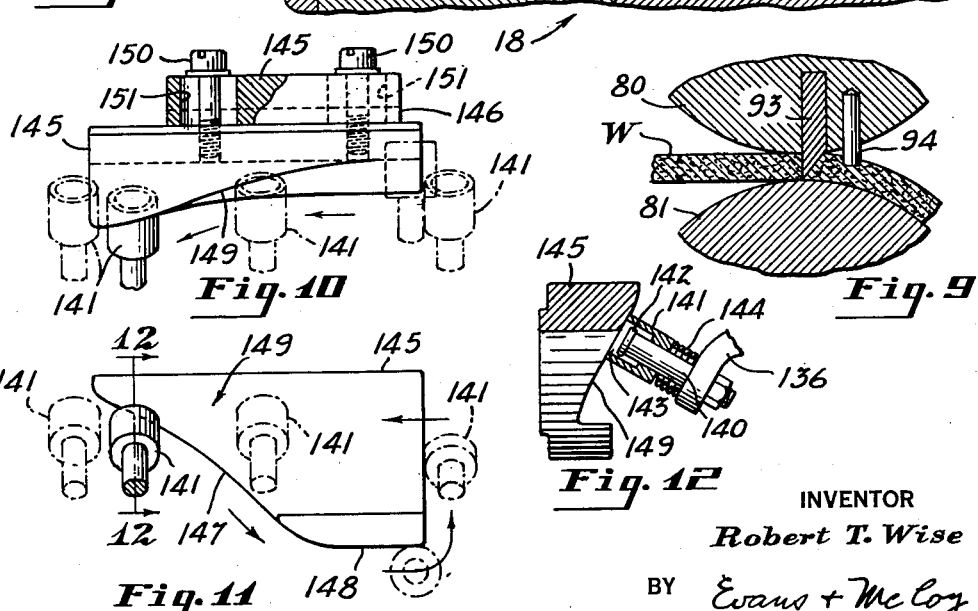

July 31, 1956  R. T. WISE  2,756,696
MACHINE FOR MAKING WAFERS AND FORMING THEM INTO CONES
Filed Sept. 12 1952  9 Sheets-Sheet 5
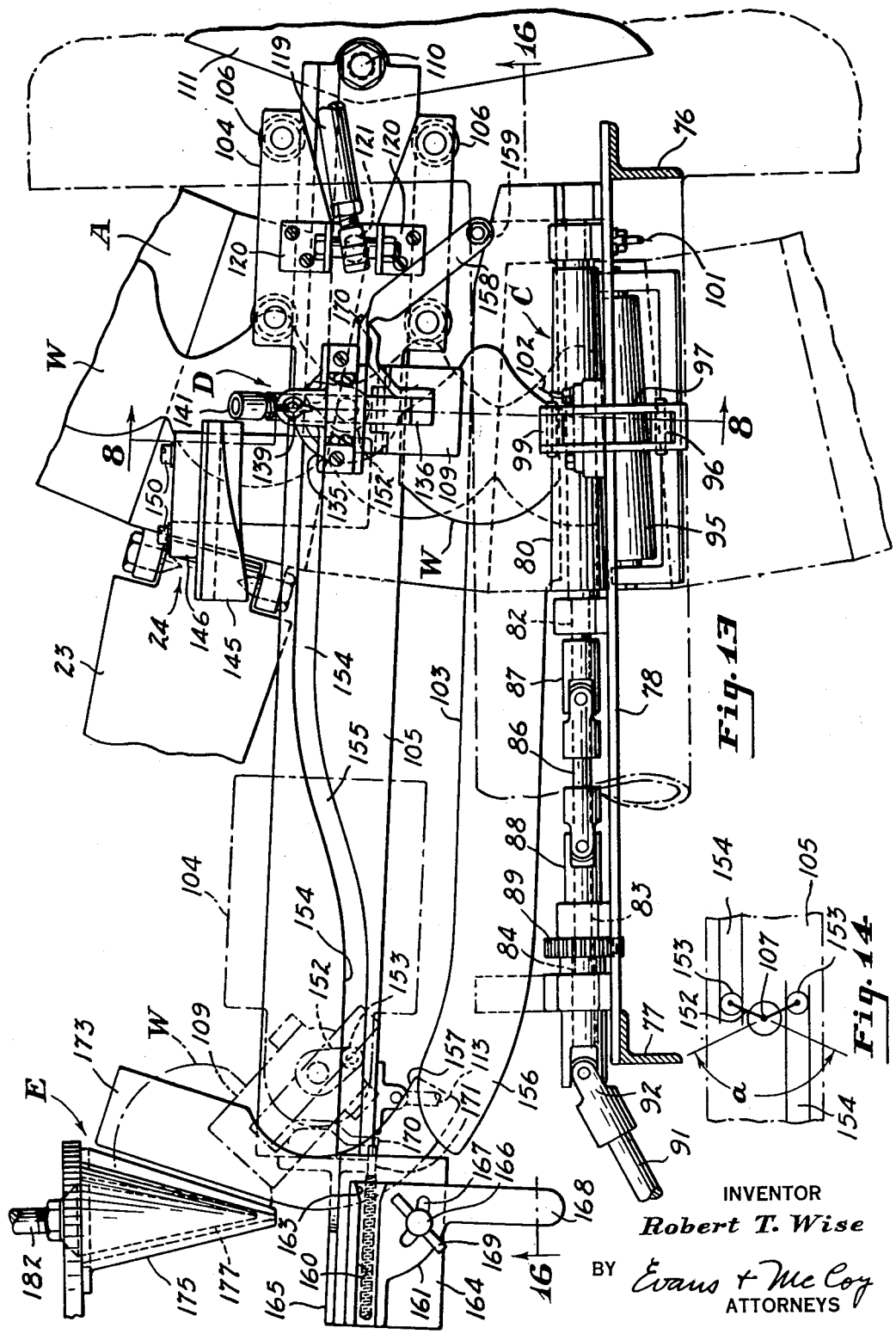
INVENTOR
*Robert T. Wise*
BY *Evans + McCoy*
ATTORNEYS

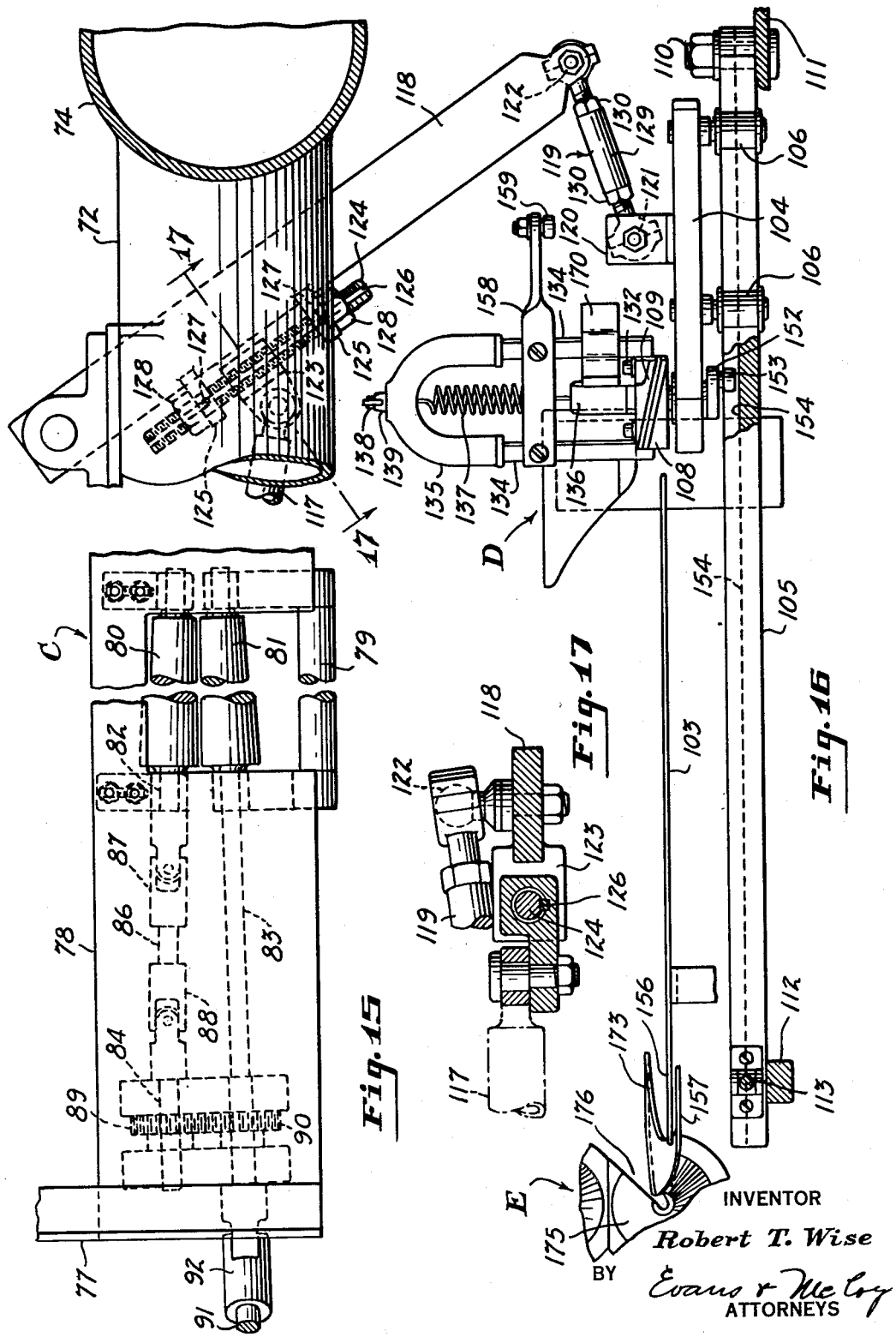

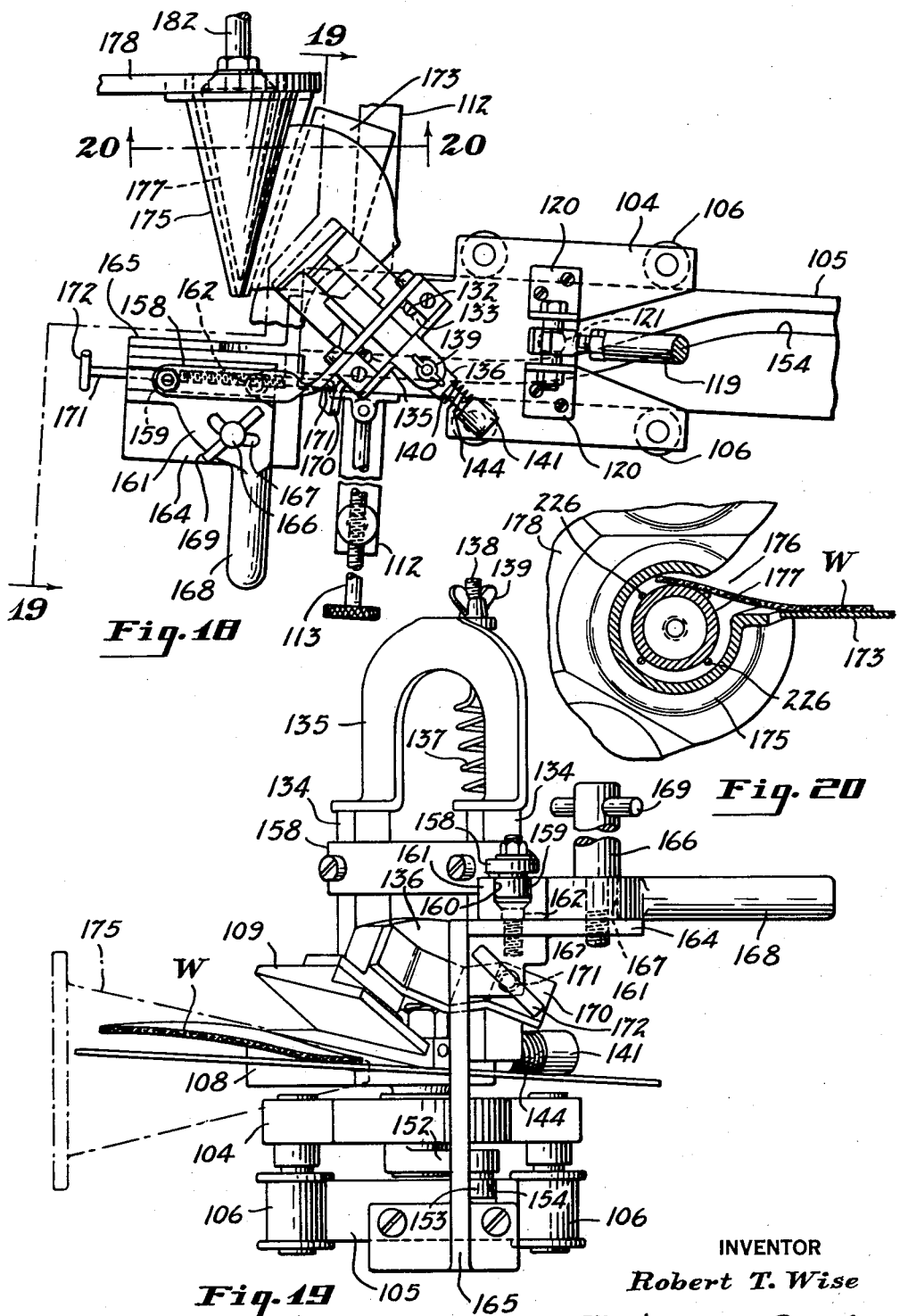

July 31, 1956 R. T. WISE 2,756,696
MACHINE FOR MAKING WAFERS AND FORMING THEM INTO CONES
Filed Sept. 12 1952 9 Sheets-Sheet 8
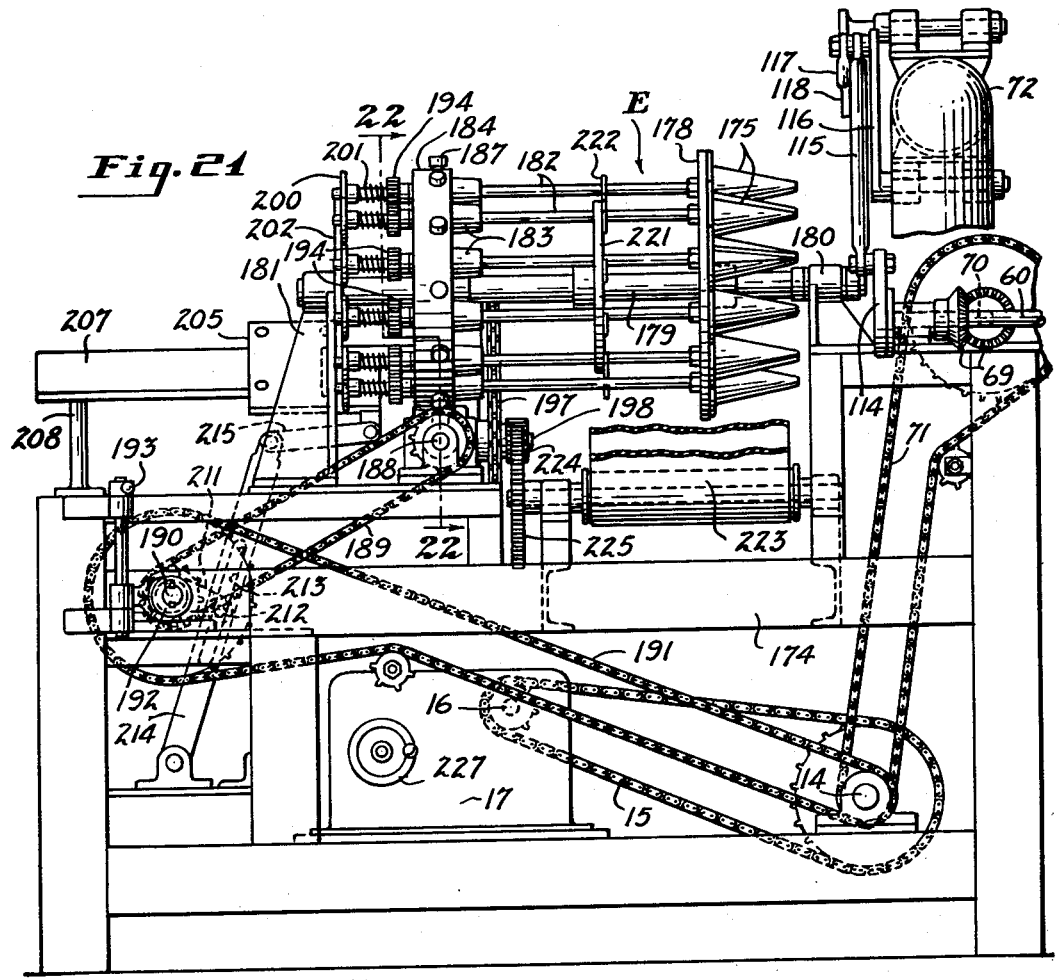
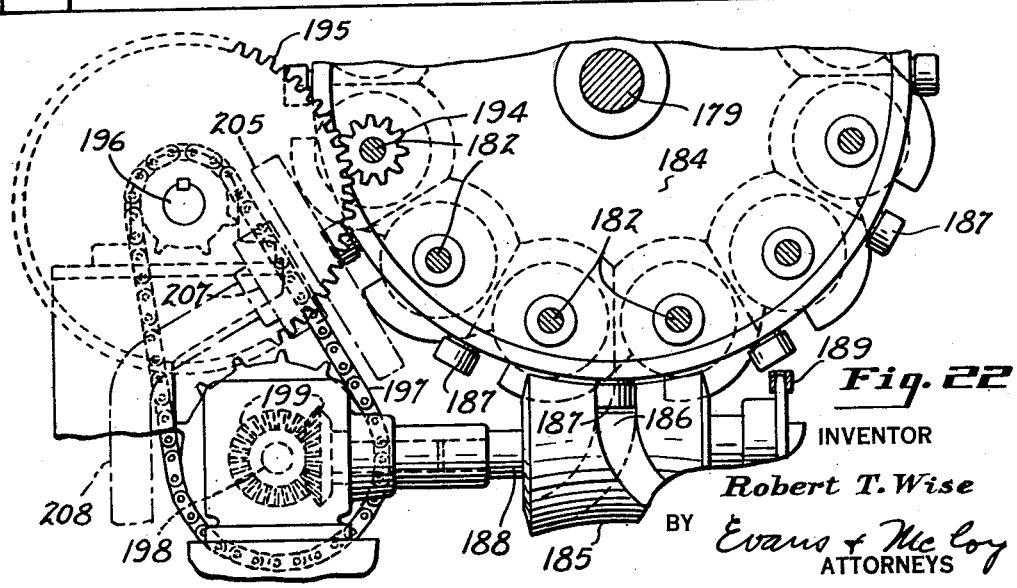
INVENTOR
Robert T. Wise
BY Evans + McCoy
ATTORNEYS

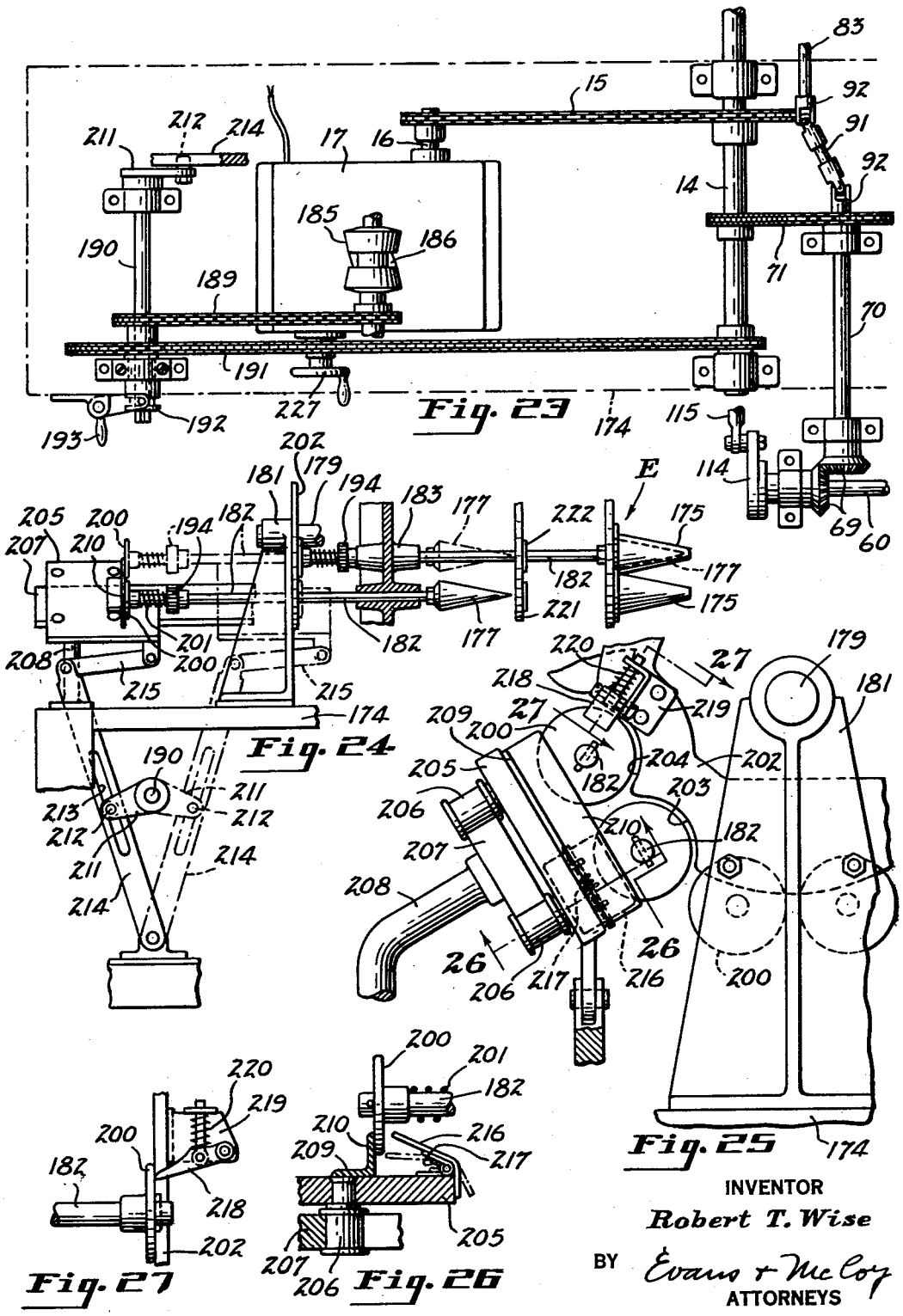

United States Patent Office 2,756,696
Patented July 31, 1956

2,756,696

MACHINE FOR MAKING WAFERS AND FORMING THEM INTO CONES

Robert T. Wise, Columbus, Ohio, assignor to The Cream Cone Machine Company, Columbus, Ohio, a corporation of Ohio Application September 12, 1952, Serial No. 309,176

28 Claims. (Cl. 107—4)

This invention relates to the manufacture of edible pastry cones suitable for use as ice cream containers and more particularly to a machine for making wafers and rolling them to conical form.

The machine of the present invention comprises a baking unit which delivers a continuous strip of wafers to a wafer severing mechanism which cuts the wafers apart as they are delivered from the baking unit, a cone forming mechanism that is operable to roll hot wafers to conical form and to hold the same while they cool and harden before discharging, and a transfer mechanism which delivers the individual wafers from the severing mechanism to the cone forming mechanism.

Means is provided for delivering batter to the baking unit in such manner that the size and shape of the wafers may be varied and the transfer mechanism is adjustable relative to the severing and cone forming mechanisms to accommodate wafers of different sizes and shapes.

The baking unit is of the turntable type, having a continuous bed on which the strip of wafers is formed and from which the leading end of the wafer strip is lifted by means of radially disposed rollers that grip the strip and that are driven at a peripheral speed substantially equal to the speed of travel of the portion of the bed of the baking unit from which the strip is lifted. The wafer strip is maked during its travel on the rotating bed and is continuously guided upwardly away from the bed to a severing mechanism which cuts the wafers apart as they are delivered from the baking unit.

A reciprocating transfer carriage is provided for delivering each wafer as it is severed from the strip to the cone rolling mechanism which consists of a series of traveling formers each of which is operated to roll a wafer into conical form and to hold the formed cone until it is cooled and hardened and to then discharge the cone. The transfer mechanism and cone forming mechanism are operated in timed relation to the rate of travel of the baking unit, so that the individual wafers are transferred to the rolling mechanism as they are delivered from the baking unit.

Means is provided for delivering predetermined masses of batter at predetermined time intervals to the continuous rotary bed of the baking unit to form wafers of a desired size that are joined edge to edge in a continuous strip. The batter feeding means is designed to form wafers of a tapering generally triangular form suitable for forming conical containers of substantially uniform wall thickness. The batter feeding means is also adjustable to vary either the size or the shape of the wafers and the transfer mechanism is adjustable with respect to both the severing mechanism and the forming mechanism to properly handle wafers of various sizes and shapes.

Important objects of the invention are to provide a wafer baking and cone forming machine that operates continuously and rapidly, to provide means for adjusting the batter feeding mechanism to produce wafers of various sizes and shapes, to provide means for adjusting the transfer mechanism to properly handle wafers of different sizes and shapes, and to economize material by providing a machine which will form and deliver to the cone forming mechanism wafers that are of a generally triangular form adapted to be shaped into a conical container with a minimum of overlap.

Reference should be had to the accompanying drawings forming a part of this specification, in which:

Fig. 2 is a side elevation of the machine;

Fig. 3 is a fragmentary radial section through the portion of the baking table in which the cover sections are swung to open position to expose the bed thereof;

Fig. 4 is a fragmentary side elevation on an enlarged scale of the batter pumping mechanism, a portion of the pump chamber being broken away and shown in section;

Fig. 5 is a fragmentary section taken on the line indicated at 5—5 in Fig. 4 and showing the means for detachably securing the batter pump in position on the frame;

Fig. 6 is a fragmentary side elevation of the adjustable nozzles through which batter is delivered to the baking table;

Fig. 7 is a fragmentary plan view showing the shape of the wafer strip that is formed on the bed of the baking table by the batter intermittently delivered thereto by the pump;

Fig. 8 is a fragmentary vertical section transversely through the wafer strip lifting and severing mechanisms and a portion of the transfer mechanism taken on the line indicated at 8—8 in Fig. 13;

Fig. 9 is a fragmentary section on an enlarged scale transversely through the bight of the strip lifting rollers and showing the strip severing blade in strip severing position in the bight of said rollers;

Fig. 10 is a plan view of the cam that opens the wafer gripper of the transfer mechanism to receive a wafer from the severing mechanism;

Fig. 11 is a side elevation of the gripper opening cam shown in Fig. 10;

Fig. 12 is a transverse section through the gripper opening cam taken on the line indicated at 12—12 in Fig. 11;

Fig. 13 is a plan view on an enlarged scale showing the wafer strip lifting and severing mechanism and the wafer transfer mechanism for delivering the individual wafers from the severing mechanism to the cone forming mechanism;

Fig. 14 is a diagrammatic view showing the rotating movement of the wafer holding gripper during the transfer of the wafer from the severing mechanism to the cone forming mechanism;

Fig. 15 is a fragmentary side elevation of the strip lifting rollers and their driving shafts;

Fig. 16 is a vertical section taken on the line indicated at 16—16 in Fig. 13 and showing the transfer mechanism in side elevation;

Fig. 17 is a fragmentary section taken on the line indicated at 17—17 in Fig. 16 showing the adjustable connection between the transfer carriage actuating lever and the connecting rod that actuates it;

Fig. 18 is a fragmentary plan view showing the delivery end of the wafer transfer mechanism;

Fig. 19 is a side elevation of the wafer transfer carriage viewed as indicated at 19—19 in Fig. 18 showing it in the position where it delivers a wafer to the cone forming mechanism;

Fig. 20 is a fragmentary transverse section through one of the cone forming units taken on the line indicated at 20—20 in Fig. 18;

Fig. 21 is an elevation looking toward the outer side of the cone forming mechanism and toward the outer end of the transfer mechanism;

Fig. 22 is a vertical section taken on the broken line indicated at 22—22 in Fig. 21;

Fig. 23 is a schematic plan view of the driving mechanism;

Fig. 24 is a fragmentary vertical section taken on the line indicated at 24—24 in Fig. 22;

Fig. 25 is a fragmentary elevation looking toward the outer end of the cone forming mechanism;

Fig. 26 is a fragmentary section taken on the line indicated at 26—26 in Fig. 25; and Fig. 27 is a fragmentary section taken on the line indicated at 27—27 in Fig. 25.

Figure 1:
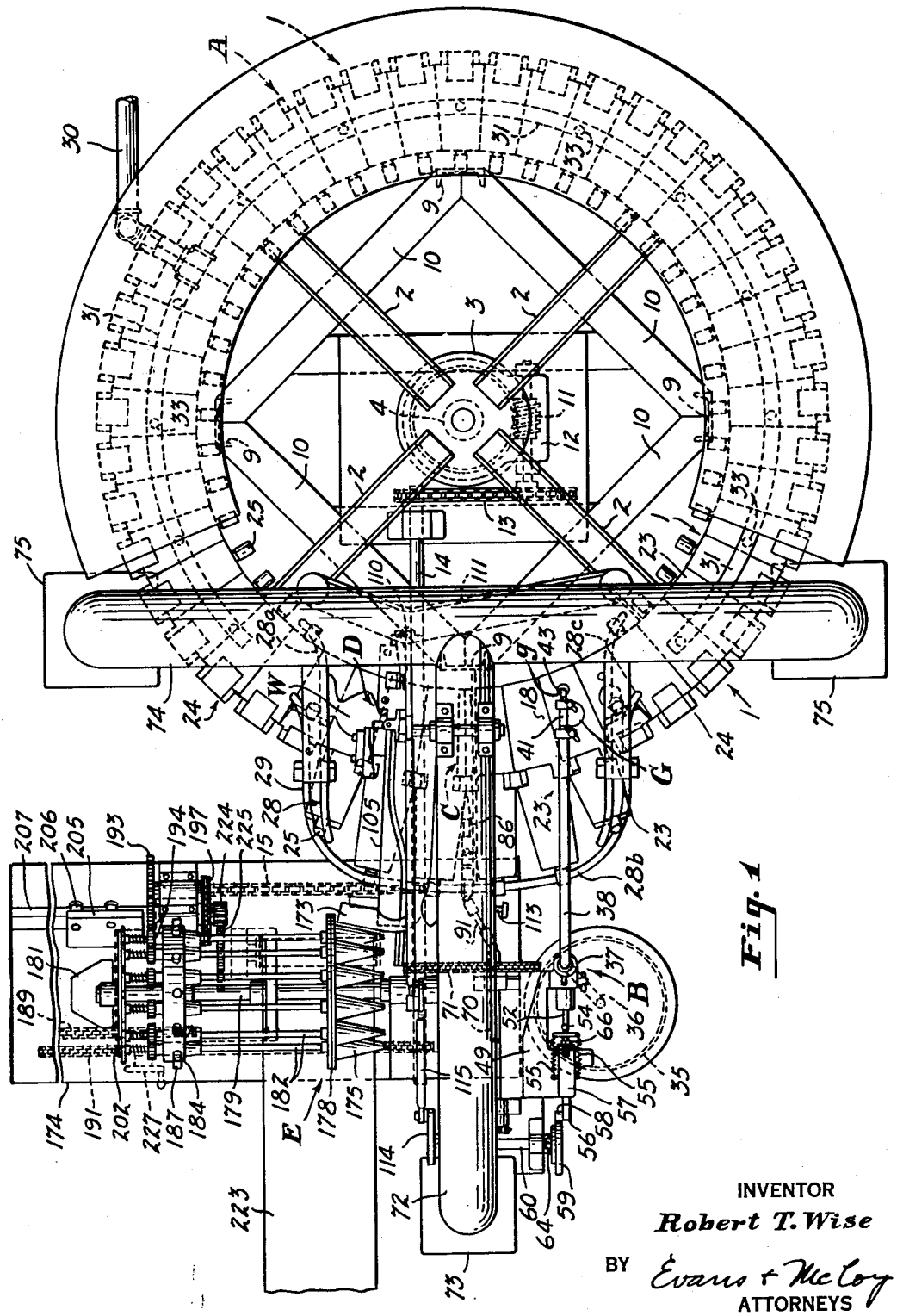
Figure 1 is a plan view of a pastry cone making machine embodying the invention.

As best shown in Figs. 1 and 2 of the drawings, the machine of the present invention consists of a wafer strip baking unit A of the rotary turntable type, a batter feeding mechanism B for intermittently delivering masses of batter to the baking unit A, a wafer strip lifting and severing mechanism C for delivering wafers from the baking unit, a transfer mechanism D for conveying the individual wafers from the severing mechanism, and a cone forming mechanism E to which the wafers are delivered by the transfer mechanism D.

The baking unit A is designed to deliver a continuous strip of wafers to the severing mechanism C from which the hot wafers are conveyed after being severed from the strip by the transfer mechanism D to the cone forming mechanism E which is spaced radially from the baking unit A a distance such that little or no heat is radiated from the baking unit to the cone forming mechanism which shapes the wafers to conical form and which holds the formed cones while they cool and harden sufficiently to permit them to be packaged.

The baking unit

As shown in Figs. 1 and 2, the baking unit A has a horizontally disposed baking annulus 1 that is connected by radial bars 2 to a disk 3 attached to a central vertical shaft 4. The annulus 1 has a beveled bearing ring 5 attached to the under sides of the radial bars 2 adjacent their outer ends and resting on inwardly tapering rollers 6 carried by short horizontal shafts 7 journaled in bearings 8 on the upper ends of supporting posts 9 that are disposed at circumferentially spaced points and that are connected by bracing cross members 10. The annulus 1 rotates with the central shaft 4 that is continuously driven by worm gearing 11 in a housing 12 that encloses the shaft 4. The gearing 11 is driven through a sprocket chain 13 from a horizontal shaft 14 that is driven by a sprocket chain 15 from a drive shaft 16 that projects from a motor housing 17 in which the driving motor and suitable change speed mechanism (not shown) is enclosed.

The baking annulus 1 has a circumferentially continuous annular bottom or bed 18 supported on inner and outer concentric rings 19 and 20. The inner ring 19 is attached to the outer ends of the radial arms 2 and the ring 20 is supported from the ring 19 by radial spacing members 21. The continuous annular bed 18 is preferably formed of metal sections attached to the rings 18 and 19 by suitable means such as screws 22. The baking annulus has a cover formed by sector-shaped sections 23 that are connected at their outer ends to the bed 18 adjacent its outer periphery by hinges 24, the sections 23 abutting edge to edge along radial lines when in their closed position overlying the bed 18 to form a circumferentially extending cover. Each of the sections 23 is swung outwardly on its hinge 24 and held in a position outwardly beyond the periphery of the bed 18 during a portion of each revolution of the annulus 1, after which it is returned to closed position so that the baking annulus is provided with an arcuate closed zone extending through the major portion of its circumference and a shorter arcuate open zone in one quadrant of the annulus. The bed 18 is exposed in the open zone where batter may be fed thereto to form a strip of wafers and from which the leading end of the wafer strip may be lifted after it emerges from the closed zone where the strip is baked. Each of the sections 23 has a roller 25 that is carried by a stub shaft 26 attached to the inner end of the section 23 by means of a screw 27. The roller 25 provides an actuating arm for the hinged section 23 by means of which the section may be swung about its pivot.

During rotation of the baking annulus 1 the rollers 25 engage with a cam track 28 which has a lifting portion 28a that is arched over the annulus 1, and are thereby guided into engagement with an adjoining track section 29 having a central arcuate portion 28b that is disposed radially outwardly of the bed 18 at substantially the level of the bed to support the sections 23 in substantially horizontal position outwardly of the bed 18 and an end portion at the opposite end of the horizontal portion 28b which is also arched over the annulus 1 and that serves to guide the rollers upon a track 28c similar to portion 28a and thereby return the sections 23 to closed position.

A conduit 30 delivers gas to upper and lower arcuate pipes 31 and 32 that have angularly spaced burner nozzles 33 and 34, the upper burner nozzles 33 being positioned above and close to the top sections 23 in the closed zone and the bottom nozzles 34 projecting into the space between the rings 19 and 20. The burners supply heat to the bed 18 and to the cover sections 23 to bake the batter which forms a continuous strip on the bed 18.

Batter feeding means

Batter is fed to the annular bed 18 in the open zone of the baking unit adjacent the return portion 28c of the cam track in such manner as to form wafers of uniform size that are joined together in a continuous strip that is baked in the closed zone of the baking unit. As shown in Figs. 1 and 2, a batter tank 35 is spaced outwardly from and below the level of the annulus 1 and batter is elevated through a pipe 36 from the tank 35 to a pump casing 37 and is delivered from the pump casing through a pipe 38 to two radially spaced delivery nozzles 39 and 40 that are positioned directly over the annular bed 18 near the return portion 28c of the cam track 28. The outer nozzle 39 is of larger diameter than the inner nozzle 40 and delivers a larger volume of batter onto the bed 18. Batter is intermittently pumped through the pipe 38 and delivered in measured volumes through nozzles 39 and 40. Upon each delivery of batter through the nozzles 39 and 40 the nozzle 39 deposits a relatively large mass of batter indicated at G in Fig. 7 of the drawings, and the small nozzle 40 deposits a relatively small mass g of batter as indicated in Fig. 7. The batter, being fluent, spreads on the bed 18 to form a wafer W which is radially elongated and which tapers toward the axis of the baking annulus. The masses of batter are delivered to the annular bed 18 at intervals timed with respect to the rate of turning movement of the bed to form elongated tapering wafers W which have edge portions joined together at narrow neck portions w.

In order to properly space the nozzles 39 and 40 to form wafers of different sizes and shapes, the nozzles 39 and 40 are adjustably attached to the conduit 38. The nozzle 39 is carried by a pipe section 41 that has telescopic engagement with the pipe 38 and which is clamped in different positions of radial adjustment with respect to the bed 18 by means of a manually operable clamp 42. The nozzle 40 is carried by a pipe section 43 that has telescopic engagement with the pipe section 41 and that is secured in radially adjusted position by means of a manually operable clamp 44. The pipe sections 41 and 43 carrying the nozzles 39 and 40 are readily detachable and can be replaced with other pipe sections carrying nozzles of different sizes.

As shown in Fig. 4, the pump casing 37 has an outlet portion 45 that is connected to the pipes 36 and 38 and that is provided with check valves 46 and 47 that prevent reverse flow from the pump casing into the pipe 36 and from the pipe 38 back into the pump casing. The pump casing 37 has a laterally projecting cylindrical portion 48 that is secured to a fixed frame member 49 by means of clamping screws 50 provided with handles 51 for manual operation so that the pump may be quickly and easily detached for cleaning. A plunger 52 reciprocates in the cylinder 48 and is detachably connected to a crosshead 53 at its outer end by a vertical pivot pin 54. Coil springs 55 connected at opposite ends to the crosshead 53 and to the supporting frame normally hold the plunger 52 in retracted position. The crosshead 53 has a bar 56 attached thereto which is alined with the plunger 52 and which slides in a fixed guide 57 mounted on the frame member 49. At its outer end the bar 56 carries a roller 58 that is positioned in the path of a cam 59 attached to a continuously driven transverse shaft 60. The cam 59 imparts a forward stroke to the plunger 52 once during each rotation of the shaft 60.

It is desirable to discontinue the delivery of batter to the baking unit at certain times during operation of the machine, for example, before stopping the machine to permit the wafer strip to be completely discharged from the baking unit before the machine is stopped. In order to stop the feed of batter without stopping the machine, means is provided for locking the batter plunger 52 in its forward position with the roller 58 clear of the cam 59 so that the shaft 60 may continue to rotate without pumping batter. The outer end of the bar 56 is provided with a notch 61 that is adapted to receive a roller 62 carried by a latch lever 63 that can be operated manually to engage the roller 62 with the notch 61 when the plunger 52 is in its forward position.

In order to vary the timing of the batter ejecting movement of the plunger 52, the cam 59 is mounted for angular adjustment on the shaft 60, being connected to a collar on the shaft 60 by means of bolts 64 that pass through arcuate slots 65 in the collar.

In order to increase or decrease the volume of batter discharged upon each actuation of the plunger 52, a nut 66 threaded on the bar 56 may be turned to adjust it longitudinally of the bar. The nut 66 is engageable with the inner end of the guide 57 to limit the movement of the bar 56 toward the cam 59. By adjusting the nut 66 the length of the batter ejecting stroke of the plunger 52 and the volume of batter ejected may be accurately adjusted. In order to prevent accidental turning of the nut 66 during operation of the machine, a latch member 67 is pivoted to the guide 57 and is engageable with any one of several notches 68 formed in the periphery of the nut 66.

As best shown in Figs. 21 and 23 of the drawings, the shaft 60 is driven through bevel gears 69 by a shaft 70 that is driven from the shaft 14 by a sprocket chain 71. Since the baking annulus 1 and the batter pump actuating cam 59 are both continuously driven from the shaft 14, the batter pump is actuated in timed relation to the travel of the annular bed 18 upon which the batter is deposited through the nozzles 39 and 40. Since the baking annulus 1 turns through a predetermined small angle during each revolution of the shaft 60 and, since a charge of batter is delivered to the bed 18 during each revolution of the shaft 60, the angular spacing of the neck portions $w$ of the wafer strip is uniform and always the same regardless of the adjustments of the cam 59, of the nut 66 or of the nozzles 39 and 40. The wafers are, therefore, of a predetermined angular dimension regardless of their size or of their positioning circumferentially or radially of the bed.

As shown in Fig. 1, the cover sections 23 are in closed position and provide a closed baking chamber extending throughout the major portion of the circumference of the baking annulus, the batter being baked during its travel from one end of the closed zone to the other to form a continuous strip of wafers.

*Wafer strip lifting and wafer severing mechanism*

In order to provide a support for the lifting and severing mechanism C and the transfer mechanism D, a T-shaped overhead support is provided comprising a radially extending member 72 that is supported at its outer end on a suitable base 73 and a transverse member 74 that overlies the open zone of the baking annulus and that is connected midway between its ends to the inner end of the member 72, the member 74 being supported at its opposite ends on bases 75.

As shown in Figs. 2 and 15, the strip lifting and severing mechanism C is supported on vertical bars 76 and 77 that are attached at their upper ends to the radially extending overhead member 72 and to which a radially extending plate 78 is attached. Adjacent its inner end the plate 78, as shown in Fig. 8, supports a horizontally disposed stripper rod 79 that overlies the bed 18 closely adjacent thereto and which extends radially across the bed. Directly over the stripper bar 79 two superposed frusto-conical rollers 80 and 81 are mounted. The rollers 80 and 81 are disposed radially of the baking annulus 1 with their axes oppositely inclined to dispose the bight between the rollers horizontally. The taper of the rollers 80 and 81 is such that the apices of the surfaces of revolution in which the peripheral surfaces of the rollers lie are substantially in the axis of the baking annulus, so that by providing the proper speed ratio between the rollers 80 and 81 and the baking annulus the peripheral speeds of the two rollers at all points along the length of the bight between them are substantially identical with the linear speed of points on the annular bed 18 correspondingly spaced from the axis of rotation of the bed.

The rollers 80 and 81 have shafts 82 and 83 attached thereto that diverge outwardly at a small angle. The upper roller 80 which is adjustably mounted is driven from a shaft 84 parallel to the shaft 83 through a short shaft section 86 and univesal couplings 87 and 88. The shafts 84 and 83 have intermeshing gears 89 and 90 which cause the rollers 80 and 81 to turn in opposite directions at equal peripheral speeds. The shaft 83 is connected to the continuously driven shaft 70 through a short connecting shaft 91 that is connected to the shafts 70 and 83 by universal joints 92.

The baking annulus 1, as shown in Figs. 1 and 13, turns in a counter-clockwise direction and the leading end of the wafer strip is passed upwardly over the stripper bar 79 and over the lower feed roller 81 into the bight between the rollers 80 and 81. The direction of rotation of the rollers 80 and 81 is such that the wafer strip is fed through the bight between the rollers in a direction opposite to the travel of the annular bed 18 and, since the peripheral speed of the rollers at the bight corresponds to the peripheral speed of the bed 18 with the same difference in speed between the portions of the rollers engaging the inner and outer edges of the wafer strip as between the portions of the supporting bed with which the inner and outer edges of the strip engage, the direction of movement of the wafer strip is reversed in the bight of the rollers 80 and 81 without changing the positions of the individual wafers with respect to the axis of rotation of the baking annulus.

The upper roller 80 carries a longitudinally extending blade 93 that projects radially past its periphery a distance equal to the depth of the bight between the rollers, so that when the blade is brought to vertical position as shown in Fig. 9, its edge will be substantially in contact with the surface of the lower roller 81 and the wafer strip will have been severed. Since the portion of the wafer strip passing between the rollers 80 and 81 has not been shifted with respect to the radii of the baking annulus, the knife 93 will sever the wafers from the leading end of the strip on radial lines. The circumference of the roller 80 corresponds to the annular width of the wafers formed on the bed 18 which is always the same regardless of the variation in shape and in the positioning of the wafers on the bed 18, so that the wafers are severed from the strip at the narrow neck portions w. The lines of severance being radial, the individual wafers are of tapering form and, since the batter is deposited upon the bed 18 in such manner as to elongate the wafers radially, the wafers delivered from the severing mechanism are of generally triangular form adapted to be rolled into conical shape without excessive overlap of the portions of the wafer that form the pointed end of the cone.

Immediately behind the cutter blade 93 the roller 80 carries one or more pins 94 that project from the surface of the roller to engage with the end of the wafer strip behind the knife blade 93 to hold the wafer strip on the roller 81 while the end of the strip from which the wafer has been severed passes into full engagement with the bight of the rollers 80 and 81.

It is desirable that warning be given of any interruption in the feed of the wafer strip to the severing mechanism in order that the attendant may immediately rethread the strip through the strip lifting roller or stop the machine. The warning signal is operated by a metallic roller 95 that is yieldably supported in engagement with the portion of the wafer strip passing over the lower roller 81 to the bight between the rollers 80 and 81. The roller 95 serves to complete a grounding connection to a suitable electrically operated signaling device. The roller 95 is carried by an arm 96 that is pivotally suspended from a second arm 97 that is pivoted to the frame and extends across the top of the roller supporting plate 78. The arm 97 is provided with a shoulder 98 that limits the swinging movement of the arm 96 with respect to the arm 97 so that the roller swings about the pivot of the second arm 97 and the weight of both the arms 87 and 96 acts to press the roller 95 toward the roller 81. The arm 97 is pivoted to a bracket 99 that is attached to an insulating block 100 on the plate 78. A grounding wire 101 is attached to the portion of the frame in which the roller 81 is journaled and a wire 102 connects the signaling device to the bracket 99 so that a circuit through the device is completed to ground through the bracket 99, arms 96 and 97 and rollers 95 and 81 whenever the roller 95 contacts the roller 81. Any interruption in the feed of the wafer strip to the roller 81 permits the metallic roller 95 to move into contact with the roller 81 to establish a connection from the signaling device to ground through the wire 102, bracket 99, arms 96 and 97, rollers 95 and 81, the frame of the machine and the grounding wire 101. The roller 95 may be quickly and easily swung to a position where it is supported on the insulating block 100 as shown in dotted lines in Fig. 8, so that the attendant will have free access to the feed rollers 80 and 81 in threading the leading end of the wafer strip through the bight of the rollers 80 and 81. To start the feed of the wafer strip, the operator will swing the roller 95 to a position clear of the rollers 80 and 81 and will guide the leading end of the wafer strip into the bight of the rollers 80 and 81 and then place the roller 95 into engagement with the wafer strip on the roller 81 to assist in retaining the strip in engagement with the roller and to provide a signal in case of interruption of the feed of the wafer strip to the rollers. If the wafer strip should be broken between the feed rollers and the baking table, the feed would be discontinued and warning will be given by the signal operated when the roller 95 contacts the roller 81.

*Transfer mechanism*

As shown in Figs. 8 and 13, a wafer supporting plate 103 is positioned at its inner end over the bed 18 and in alinement with the bight of the rollers 80 and 81 to receive the wafers as they are delivered by the rollers and extends radially outwardly from the baking annulus to support a portion of the wafer as it is being transferred from the severing mechanism C to the cone forming mechanism E. For conveying the individual wafers from the severing mechanism to the forming mechanism, a carriage 104 is mounted for reciprocating movement on a radially disposed track 105 that overlies the horizontal portion 28b of the cam track and the bed 18 at its inner end and that extends alongside the supporting plate 103. The track 105 is in the form of a flat bar and the carriage 104 is supported on the track by means of flanged rollers 106 that roll upon opposite side edges of the track. The carriage 104 has a centrally disposed vertical shaft 107 journaled therein which supports wafer gripping means comprising a horizontally disposed lower jaw 108 and a vertically swinging upper jaw 109. The jaw 108 is disposed substantially at the level of the plate 103 so that the wafer gripped along one edge by the jaws 108 and 109 will be dragged along the plate 103 when the carriage 104 is moved outwardly on the track 105.

In order to properly position the carriage 104 for wafers of different sizes and shapes the track 105 is adjustable relative to the cone forming mechanism. As best shown in Figs. 13 and 16 the inner end of the track 105 is connected by a vertical pivot 110 to a bracket 111 suspended from the transverse supporting member 74. The outer end of the track 105 is slidably supported on a transversely extending horizontal frame bar 112 and is adjustable laterally as shown in Fig. 18 by means of a manually operable screw 113 connected to the track 105 and to the supporting bar 112. Lateral adjustment of the outer end of the track 105 serves to position the path of travel of the transfer carriage and to determine its position with respect to the cone forming mechanism E at the outer limit of its movement. This adjustment, together with certain adjustments of the carriage actuating mechanism enables the machine to efficiently handle wafers of various sizes and shapes.

The carriage 104 is reciprocated on the track 105 by means of mechanism operated by a crank arm 114 on the shaft 60. As shown in Fig. 2, a connecting arm 115 connects the crank arm 114 with an oscillating arm 116 that is pivoted at its lower end to the overhead supporting member 72. A rod 117 connects the arm 116 with an arm 118 pivoted at its upper end to the radial supporting member 72. The lower end of the swinging arm 118 is connected to the carriage 104 by a link 119. In order to permit the changes in the path of travel of the carriage provided by adjustments of the track 105, the link 119 is connected to a bracket 120 on the carriage 104 and to the lower end of the arm 118 by ball joints 121 and 122 as shown in Figs. 16 and 17 of the drawings.

In order to properly handle wafers of different sizes and shapes, means is provided for adjusting the length of the reciprocating stroke of the carriage 104 and also for changing the limits of movement of the carriage on the track. By adjusting the stroke of the carriage the receiving and discharging positions thereof with respect to the wafer serving and cone forming mechanisms may be accurately adjusted to insure proper feeding of wafers to the cone forming mechanism. The length of stroke of the carriage is increased or decreased by means of an adjustable connection between the rod 117 and the swinging arm 118 and this connection, as best shown in Fig. 16, is provided by an attaching member 123 that is adjustable longitudinally of the arm 118. The member 123 is fixed to a screw 124 that is slidably mounted in spaced brackets 125 fixed to the arm 118. To hold the screw 124 against turning movements the screw is provided with a longitudinal keyway 126 that receives screws 127 mounted in the brackets 125. Nuts 128 mounted on the screw 124 are engageable with the brackets 125 to hold the screw in adjusted position. By adjusting the nuts 128 the screw 124 and the attaching member 123 may be adjusted longitudinally of the arm 118 to increase or decrease the angular stroke of the arm 118 and to correspondingly increase or decrease the length of the horizontal stroke of the carriage 104.

In order to adjust the limits of movement of the carriage 104 on the track 105 the link 119 is an extensible link provided with a turnbuckle 129 that is held in adjusted positions by lock nuts 130. By shortening the link 119 the inner and outer limits of movement of the carriage 104 are adjusted radially inwardly and by extending the link 119 the inner and outer limits of movement of the carriage 104 are adjusted radially outwardly. By adjusting the stroke of the carriage 104 and the path of travel of the carriage with respect to the severing mechanism and the cone forming mechanism the proper feed of wafers of various sizes and shapes to the cone forming mechanism is obtained.

As best shown in Fig. 8, the lower gripper jaw 108 is attached to a collar 131 fixed to the vertical shaft 107 by means of bolts 132, which, as shown in Fig. 18, pass through arcuate slots 133 in the attaching portion of the jaw 108. Spaced posts 134 are attached at their lower ends to the horizontally disposed jaw 108 and are connected at their upper ends by an arched cross bar 135. The upper jaw 109 is hinged to the lower jaw 108 adjacent the vertical shaft 107 to swing vertically and has an arm 136 rigidly attached thereto that extends radially over the upper end of the shaft 107. The upper jaw 109 is normally held in its closed or gripping position by means of a coil spring 137 attached at its lower end to the arm 136 and at its upper end to a screw 138 adjustably mounted in the arched cross bar 135. The screw 138 is adjustable vertically by means of a wing nut 139 by means of which the tension of the spring 137 may be adjusted to provide the desired light gripping pressure on the wafers being transferred from the severing mechanism to the cone forming mechanism. During the travel of the carriage 104 between the severing mechanism and the cone forming mechanism the upper jaw 109 is held in gripping engagement with the wafer by means of a spring 137 and means is provided adjacent the severing mechanism to raise the jaw 109 to receive a wafer and means is provided adjacent the cone forming mechanism to open the jaw 109 to release a wafer.

For swinging the upper jaw 109 to open position at the inner end of the stroke of the carriage 104 to permit a wafer to be fed across the supporting plate 103 and onto the lower jaw 108 by the rollers 80 and 81, the arm 136 carries a stub shaft 140 which, as shown in Figs. 8 and 12, has a roller 141 that is rotatably and slidably mounted thereon. The shaft 140 has a head 142 at its outer end which is received in a counterbore 143 in the outer end of the roller 141 and the roller 141 is normally held in its outermost position on the stub shaft 140 by means of a coil spring 144 interposed between the inner end of the roller 141 and the arm 136. The jaw 109 is swung to its open position as the carriage 104 approaches its inner limit of movement by means of a stationary cam 145 positioned in the path of the roller 141. The cam 145 is attached to a bracket 146 that is attached to the under side of the track 105 near its inner end. As shown in Fig. 11, the cam 145 has a slanting bottom 147 that is engaged by the roller 141 during the inward travel of the carriage 104 to swing the arm 136 downwardly and move the paw 109 to open position. The cam 145 has a horizontal bottom portion 148 along which the roller 141 travels during the final portion of the inward travel of the carriage 104 to hold the jaw 109 in open position while a wafer is being fed across the supporting plate 103 onto the bottom jaw 108.

At the inner end of the travel of the carriage 104 the roller 141 moves past the inner end of the cam 145, releasing the roller 141 and permitting the spring 137 to close the upper jaw 109 on a wafer resting on the lower jaw 108. In order to permit the roller 141 to pass the outer end of the cam 145 without interference, the cam 145 is provided with a curved inner face 149 with which the outer end of the roller 141 engages during outward movement of the carriage and which presses the roller 141 inwardly against the spring 144 as shown in Fig. 12, to permit the roller to pass the outer end of the cam 145. The cam 145 is mounted for adjustment longitudinally of the track 105 on which it is supported to properly position it for different adjustments of the stroke of the carriage 104. As shown in Fig. 10 the cam 145 is attached to the bracket 146 by means of bolts 150 that extend through elongated slots 151 in the cam 145. By means of the bolt and slot connection the cam can be adjusted radially to cause the gripper jaw 109 to open and close at proper times with respect to the movements of the carriage 104 and the wafer feed rollers 80 and 81.

In order to properly position the gripping means on the carriage with respect to the cone forming mechanism for the delivery of a wafer to the cone forming mechanism, the wafer gripper and the shaft 107 to which it is attached are swung horizontally as the carriage 104 approaches its outer limit of movement. To impart this movement to the gripper the lower end of the shaft 107 has a laterally extending arm 152 that carries a vertically disposed roller 153 that engages in a cam groove 154 in the top face of the track bar 105. The cam groove 154 has a curved portion 155 adjacent the outer end of the track which causes the shaft 107 and the wafer gripper carried thereby to swing horizontally through an angle of more than 90° to swing the gripper around the end of the track 105 and bring the gripper to proper delivery position with respect to the cone forming mechanism E.

Adjacent the end of the track 105 the supporting plate 103 has a curved portion 156 that overlies a curved plate 157 that extends across the end of the track 105 to support the wafer as it is swung across the end of the track 105 to a position for delivery to the cone forming mechanism E. For finally positioning the wafer with respect to the cone forming mechanism, means is provided for adjusting the angular movement of the gripper jaws at the outer limit of movement of the carriage. For obtaining this adjustment a horizontal laterally extending arm 158 is attached to the posts 134 on the lower gripper bar 108 as best shown in Fig. 16 and carries a vertically disposed roller 159 at its outer end that engages in a groove 160 in a cam plate 161 supported on a portion of the frame beyond the outer end of the track 105 as shown in Figs. 13 and 18. The roller 159 engages with the groove 160 after the roller 153 has passed beyond the end of the track 105 so that the angular movement of the wafer gripper is controlled by the groove 160 after the roller 153 is released from the track groove 154.

The cam plate 161 is mounted to swing about a vertical pivot 162 that is located beneath the flaring open inner end 163 of the groove 160. The pivot 162 connects the cam plate 161 to a horizontal plate 164 attached to a frame bracket 165 and the cam plate 161 is adjustable angularly about the pivot 162 by means of a bolt 166 securing the plate 161 to a supporting plate 164 and passing through an arcuate slot 167 in the cam plate 161 that is concentric with the pivot 162. The cam plate 161 is provided with a handle 168 and the bolt 166 with a handle 169 so that the cam plate can be quickly and easily adjusted to different angular positions on the supporting plate 164. Since the pivot 162 is beneath the flaring entrance 163 of the cam groove, the entrance end of the cam groove is always properly positioned to receive the roller 159 and by adjusting the cam plate 161 angularly the amount of turning movement imparted to the wafer gripper by the groove 160 may be varied.

Adjustments of the cam plate 161 determine the amplitude of the swinging movements of the wafer gripper on the transfer carriage while adjustment of the gripper on the carriage by means of the bolts 132 in the arcuate slots 133 determines the position of the grippers at the limits of their swinging movements. By adjusting both the amplitude of movement and the limits of movement the wafer gripper may be properly positioned with respect to the wafer severing mechanism and the wafer forming mechanism in its receiving and discharging positions.

For opening the gripper at the inner end of movement of the carriage 104 a trip plate 170 is attached to the arm 136 near the jaw 109 as best shown in Figs. 16 and 19 and this trip plate is engageable with a stop pin 171 that is mounted on the bracket 165 and that extends longitudinally of the track 105 as best shown in Figs. 13 and 18. The stop pin 171 is in the form of a screw and has a handle 172 at its outer end by means of which it may be adjusted longitudinally to release the wafer from the gripper when the wafer is properly positioned for delivery into the cone forming machine. The curved plate 157 that extends around the outer end of the track 105 has a widened portion 173 on which the wafer is deposited when the wafer gripping jaw 109 is lifted by engagement with the trip plate 170 with the stop pin 171, the widened portion 173 of the supporting plate serving as a feed plate for the cone forming machine.

Cone rolling mechanism

The cone rolling mechanism is mounted on a laterally extending portion 174 of the supporting frame and is provided with a series of hollow, conical wafer shaping members 175 that are mounted for intermittent travel in an endless path while they are held against turning about their own axes. Each of the shapers 175 has a longitudinal wafer receiving slot 176 as best shown in Fig. 20, through which a wafer may be inserted and brought into engagement with a rotating conical mandrel 177 that is concentric with the shaper 175 and that has substantially the same taper as the shaper 175 so that a wafer engaged with the mandrel is drawn into the space between the mandrel and the shaper and rolled to conical form about the mandrel 177. A series of shaper and mandrel units are mounted for intermittent movement past the feed plate 173 and each unit stops with the slot 176 of the shaper 175 alongside and in alinement with the outer edge of the plate 173.

An endless series of the cone forming units are mounted in a suitable manner for travel past the receiving station. As best shown in Figs. 21 and 22 the conical shapers 175 are carried by a wheel 178 attached to a horizontal shaft 179 that is journaled at its opposite ends in bearing brackets 180 and 181 on the portion 174 of the machine frame. Shapers 175 are at equal radial distances from the axis of the wheel and are uniformly spaced circumferentially thereof. The mandrels 177 are attached to the ends of horizontal spindles 182 that are slidably and rotatably supported in elongated bearings 183 in a wheel 184 attached to the shaft 179. The spindles 182 are axially alined with the shapers 175 and each mandrel 177 is movable into and out of one of the shapers 175.

As best shown in Fig. 22, intermittent turning movement is imparted to the wheels 178 and 184 and shaft 179 by means of a cam 185 that has a peripherally extending cam groove 186 in its periphery. The cam groove 186 has an elongated dwell portion disposed in a plane perpendicular to the axis of the cam and the opposite end portions of the groove extend laterally in opposite directions to opposite side faces of the cam. The wheel 184 has rollers 187 that project radially from its periphery, that have the same angular spacing as the spindles and that are successively engaged by the cam 185 to impart a turning movement to the wheel 184 and shaft 179 corresponding to the angular spacing of the spindles during each revolution of the cam with a dwell while each roller 187 travels through the circumferentially straight portion of the groove 186. The cam 185 is continuously driven and the cam groove is so disposed that each roller 187 moves out of one end of the groove 186 as the next succeeding roller enters the opposite end of the groove, the wheel 184 being positively held against turning movements while each roller passes through the dwell portion of the cam groove. The cam 185 moves the cone forming units successively into wafer receiving position adjacent the plate 173 and the dwell portion of the cam holds them in the receiving position for a sufficient length of time for a wafer to be drawn into the shaper 175 by the mandrel.

The cam 185 is mounted on a shaft 188 that is driven by a sprocket chain 189 that is driven from a shaft 190 driven by a sprocket chain 191 from the drive shaft 14. A clutch 192 with a manually operable shifter 193 may be provided for disconnecting the shaft 190 from the drive shaft 14 to stop the cone forming unit independently of the baking unit. To insure proper timing of the cone forming mechanism with respect to the transfer mechanism the clutch 192 is of the one point or one revolution type so that the clutch elements are always in the same relative angular positions when engaged.

Each of the spindles 182 has a small gear 194 attached thereto adjacent its outer end that moves into mesh with a large gear 195 fixed to a shaft 196 journaled in the frame at one point in its travel as shown in Fig. 22. When the shaper 175 with which the shaft 182 is associated is brought into receiving position alongside the plate 173 the small gear 194 is meshed with the large gear 195 to rotate the mandrel 177. The gear 195 is continuously driven by a sprocket chain 197 from a shaft 198 that is driven by bevel gears 199 from the cam shaft 188. By means of the gears 194 and 195 each mandrel 177 is rotated during its dwell at the receiving station to draw a wafer through the slot 176 of the shaper 175 and to roll the same to conical form.

Each of the shafts 182 has a disk 200 slidably mounted thereon adjacent its outer end and these disks are normally held in their outermost positions on the shafts by means of coil springs 201 interposed between the disks and the gears 194. Throughout the major portion of the circumferential travel of the spindles 182 the disks 200 are engaged by a fixed backing plate 202 that maintains a pressure on the springs 201 to yieldably hold the mandrels 177 in their forward positions within the shapers 175. As best shown in Fig. 25 the plate 202 has two peripheral notches 203 and 204 through which the disks 200 can move that permit the disks 200 to move to their outermost positions on the spindles 182 when the disks register with the notches. The notch 204 registers with the disk 200 on a spindle 182 that is in wafer receiving position and the notch 203 registers wtih the disk on an adjacent spindle, the notch 203 permitting the spindle alined therewith to be moved endwise to discharge a formed cone from its mandrel and the notch 204 permitting the spindles to be returned to operative position to receive another wafer.

For retracting and returning the spindles 182, a carriage 205 is supported radially outwardly of the notches 203 and 204 by flanged rollers 206 that travel longitudinally on a track 207 that is disposed parallel to the spindles 182. The track 207 is supported in fixed position by one or more posts 208 attached to the frame 174. The carriage 205 is alined with the notches 203 and 204 and has a flat face close to the peripheries of disks 200 that carries a transverse angle bar 209 that has a flange 210 in a plane parallel to that of the plate 202 that is engageable with the outer faces of the disks 200 to move the disks inwardly through the notch 204 past the plate 202 to return the mandrels to operative position after they have been moved outwardly through the notch 203 to discharge a cone. The carriage 205 is reciprocated during each actuation of the cone forming assembly by means of a crank 211 on the shaft 190 that carries a pin 212 that engages in a longitudinal slot 213 in a lever 214 that is pivoted at its lower end to the frame and that has a link 215 at its upper end connecting it to the carriage 205.

When the disk 200 of one of the spindles 182 is alined with the notch 204 the shaper 175 associated with the spindle 182 that is alined with the notch 204 is in a receiving position with respect to the plate 173. The cone forming assembly rotates in clockwise direction as viewed in Fig. 25 so that the cone forming unit alined with the notch 204 receives and forms a wafer which is then carried in a clockwise direction through nearly the entire circumference of the assembly until it is positioned in alinement with the notch 203. On each outward movement thereof the carriage 205 imparts an outward endwise movement to the spindle 182 alined with the notch 203 to withdraw the mandrel 177 thereof and a pastry cone formed thereon from its associated shaper 175 to discharge the formed wafer from the mandrel during the dwell period. The return movement of the carriage 205 occurs during the indexing movement of the assembly and returns the spindle to operative position as it moves into wafer receiving position, the disk 200 of the spindle passing through the notch 204 and returning the empty mandrel to wafer receiving position. Thus, each of the pastry cones after it is rolled to conical form on a mandrel, is carried with the mandrel and allowed to cool and harden within the shaper during the major portion of the revolution of the cone rolling assembly so that the pastry cones are in condition to be packed in suitable containers after they are delivered from the forming mechanism.

In order to enable the carriage 205 to pull the disks 200 out through the notch 203 a portion of the carriage 205 in alinement with the notch 203 inwardly of the flange 210 carries a pivoted latch 216 that is normally held in an upwardly inclined position in the path of the disk 200 by a spring 217. When a disk 200 of a spindle 182 moves into registry with the notch 203 the spring 201 acting on said disk 200 moves it outwardly through the notch 203 past the latch 216 and into engagement with the stop flange 210. Upon outward movement of the carriage 205 the latch 216 engages the inner face of the disk 200 and moves the spindle 182 engaged by the latch 216 outwardly with the carriage 205. During the reciprocation of the carriage 205 the indexing movement of the cone rolling assembly occurs and the disk 200 that was moved outwardly with the carriage is shifted into alinement with the notch 204 so that upon return movement of the carriage the spindle and mandrel can be moved into wafer receiving position.

Adjacent the notch 204 the plate 202 carries a latch 218 which, as shown in Fig. 27, is pivoted to a bracket 219 attached to the plate 202 above the notch 204. The latch 218 is normally held in a downwardly inclined position for engagement with the outer face of the disks 200 by means of a spring 220 interposed between the bracket 219 and the latch 218. The latch 218 is brushed upwardly by each disk 200 as it is moved inwardly by the carriage 205 and snaps down into engagement with the outer face of the disk to hold the spindle 182 in operative position with respect to its associated shaper 175 while a wafer is being fed to its mandrel 177.

As shown in Figs. 21 and 24, a stripper disk 221 is attached to the shaft 179 between the wheels 178 and 184 and the disk 221 carries stripper fingers 222 that straddle each of the spindles and that engage with pastry cones on the mandrels 177 when the mandrels are retracted by the carriage 205. The pastry cones stripped from the mandrel 177 fall upon an endless belt discharge conveyor 223 driven through gears 224 and 225 from the shaft 198.

To insure the movement of the wafers into the shapers 175 the mandrels 177 have a surface configuration that provides a sufficiently positive driving engagement between the mandrel and the wafer to cause the mandrel to draw the wafer into the shaper. The baking irons usually have an indented configuration to form wafers with surfaces which will be readily engaged by protuberances such as shown at 226 in Fig. 20 to insure actuation of the wafer by the mandrel.

*Operation*

In operating the machine the baking unit is started into operation and brought to the proper baking temperature by means of the burners 31 and 32. After the baking annulus has been brought to the proper temperature the batter feeding mechanism is started into operation by actuating the lever 63 to release the bar 56 attached to the piston 52 and allow it to be moved by the springs 55 to a position where the roller 58 is in the path of the cam 59 on the continuously driven shaft. Since the baking time is dependent upon the speed of rotation of the baking annulus, it is desirable that the driving mechanism be controllable to provide fine adjustments of speed through a considerable range. Such adjustment may be provided by a conventional mechanical or electrical change speed mechanism within the housing 17 which may be controlled by suitable means such as the handwheel 227 shown in Fig. 21.

After the batter feeding mechanism is started into operation the baking annulus slowly rotates until the leading end of the batter strip appears in the open zone over which the strip lifting and wafer severing mechanism is mounted. The leading end of the wafer strip is then guided upwardly over the guide bar 79 and into the bight between the conical rollers 80 and 81, the roller 95 being positioned in inoperative position as shown in dotted lines in Fig. 8 during the threading of the wafer strip through the rollers 80 and 81. After the wafer strip is threaded through the rollers 80 and 81 the strip engaging the roller 95 is returned to operative position and thereafter a wafer will be severed from the leading end of the strip upon each revolution of the upper roller 80 which carries the radially disposed cutting blade 93.

The carriage 104, which is reciprocated in timed relation to the operation of the baking annulus and wafer severing mechanism will be in position to receive each wafer as it is severed by the cutter blade 93 from the wafer strip. During the inward movement of the carriage 104 the upper gripper jaw 109 is lifted by the cam 145 and released at the end of the stroke of the carriage to allow the jaw 109 to move into gripping engagement with a wafer which is then dragged radially outwardly with the carriage along the radially extending plate 103. As the carriage approaches its outer limit of movement, the cam groove 155 acting through the crank arm 152, swings the wafer gripper about the vertical axis of the shaft 107, dragging the wafer off the plate 103 onto the curved plate 157 and into delivery position resting on the feed plate 173. The trip plate 170 carried by the upper gripping jaw 109 then strikes the stop pin 171, causing the jaw 109 to be lifted to free the wafer which in the outermost position of the carriage 104 rests on the plate 174 and projects through the slot 176 of the shaper 175 alined with the plate. Upon release the wafer is engaged by the rotating mandrel 177 which draws it into the former and rolls it into conical form.

The rotating cone forming assembly operates intermittently in proper timed relation to the operation of the transfer mechanism to receive each wafer in a shaper 175 where it is immediately rolled to conical form by the mandrel 177 within the conical shaper 176 which is rotated while in wafer receiving position by the continuously driven gear 195. When the cone forming assembly is indexed the gear 194 of the spindle 182 carrying the mandrel 177 that is in wafer receiving position moves out of mesh with the gear 195 and the spindle ceases to rotate. The mandrel 177 remains within the shaper after movement from its wafer receiving position and during nearly a full rotation of the cone forming assembly to permit the formed pastry cone thereon to cool and harden. As each cone forming unit approaches its wafer receiving position the mandrel 177 with a pastry cone thereon is pulled axially out of the shaper 175 by the carriage 205 and past the stripper disk 221 where the fingers 222 that straddle the mandrel brush the formed cone off the mandrel and onto the endless belt conveyor 223. The carriage 205 then returns the spindle 182 and its mandrel 187 into operative position with respect to its associated shaper 175 as the empty mandrel and shaper approach their receiving position alongside the feed plate 174.

During operation of the machine the speed of operation may be varied by the control wheel 227 to regulate the baking time and the stop nut 66 may be adjusted to increase or decrease the volume of batter delivered to the bed 18 upon each actuation of the batter feeding plunger 52. Also certain adjustments to the transfer mechanism to obtain a proper feeding of wafers to the cone rolling mechanism may be made without stopping the machine. The track 105 may be adjusted angularly by means of the screw 113 to shift its outer end laterally with respect to the cone forming mechanism. The cam plate 161 can be adjusted angularly by means of the handle 168 and secured in adjusted position by the bolt 166 to increase or decrease the angle through which the wafer gripper is swung immediately prior to delivery of the wafer to the cone forming mechanism and the stop screw 171 may be adjusted to advance or retard the opening of the wafer gripping jaw 109 to deliver the wafer to the cone forming mechanism.

After the machine is adjusted to handle wafers of a certain size and shape only slight adjustments that can be made while the machine is running will be necessary.

Adjustments to accommodate a considerable change in wafer dimensions may require adjustments which must be made while the machine is stopped. Angular adjustment of the cam 59 may be required to regulate the timing of the batter feed to cause the blade 93 to register with the narrow neck portions w of the wafer. Adjustment of stroke of the transfer carriage by means of the screw 124 and turnbuckle 129 may be required to provide proper positioning of the transfer carriage 104 with respect to the wafer severing mechanism and the cone forming mechanism, together with angular adjustments of the wafer grippers on the carriage by means of the bolts 132 and arcuate slots 133 and adjustment of the cam 145 by means of the bolts 150 and slots 151. Approximately correct adjustments to provide the proper timing of the batter feed and the proper travel of the transfer carriage can be made before starting the machine into operation. Any further adjustments that may be necessary will be apparent after the machine has been operated for a sufficient time to deliver wafers to the cone forming mechanism. If such additional adjustments cannot be made without stopping the machine, the batter feed will be discontinued by latching the plunger operating bar 56 out of the path of the cam 59 by means of the latch lever 63. The machine will then be operated until the wafer strip is completely discharged from the bed 18, after which the machine can be stopped and the desired adjustments made.

It is to be understood that in accordance with the provisions of the patent statutes, variations and modifications of the specific devices herein shown and described may be made without departing from the spirit of the invention.

What I claim is:

1. A machine for making pastry cones comprising an annular baking unit having a horizontal circumferentially continuous bed and means for applying heat to material on the bed, means for rotating said unit, means for depositing substantially equal masses of batter upon said bed at points regularly spaced circumferentially thereof to form wafers thereon that are joined edge to edge in a continuous strip, means for lifting the leading end of said strip from said bed and for thereafter severing the individual wafers therefrom, a cone forming mechanism spaced laterally from said baking unit, a wafer carrier mounted for reciprocating movement between said severing means and said mechanism, and means for actuating said carrier in timed relation to the travel of said unit to deliver each wafer severed from said strip to said forming mechanism.

2. A machine for making pastry cones comprising an annular baking unit having a horizontal circumferentially continuous bed and means for applying heat to material on the bed, means for rotating said unit, means for depositing substantially equal masses of batter upon said bed at points regularly spaced circumferentially thereof to form wafers thereon that are joined edge to edge in a continuous strip, means for lifting the leading end of said strip from said bed and for thereafter severing the individual wafers therefrom, a cone forming mechanism spaced laterally from said baking unit, a carrier mounted to travel between said severing means and said mechanism, wafer gripping means on said carrier, means controlled by movements of the carrier for opening and closing the gripping means, and means for actuating the carrier in timed relation to the travel of said unit.

3. A machine for making pastry cones comprising an annular baking unit having a horizontal circumferentially continuous bed and means for applying heat to material on the bed, means for rotating said unit, means for depositing substantially equal masses of batter upon said bed at points regularly spaced circumferentially thereof to form rounded wafers thereon that are joined edge to edge in a continuous strip, means for lifting the leading end of said strip from said bed and for severing the individual wafers therefrom along a line extending radially of said baking unit to provide an elongated radial portion on the severed wafers, a cone forming mechanism spaced laterally from said baking unit, said mechanism comprising a series of cone forming units mounted to travel in an endless path, means for intermittently operating said mechanism in timed relation to the travel of said unit to bring the cone forming units successively to a wafer receiving station, a wafer carrier for delivering wafers from said severing means to the forming units at said receiving station, and means for actuating said carrier in timed relation to the travel of said baking unit and for causing the carrier to swing angularly to present the elongated radial portion of the wafer to the receiving station of the cone forming unit.

4. A machine for forming pastry cones comprising an annular baking unit having a horizontal circumferentially continuous bed and means for applying heat to material on said bed, means for continuously rotating said unit, means for dropping substantially equal masses of batter onto said bed at points regularly spaced circumferentially thereof to form rounded wafers that are joined edge to edge in a continuous strip, means including a roller extending radially over said bed and means for driving said roller at a peripheral speed that is substantially equal to the peripheral speed of the bed for lifting the leading end of said strip from the bed, means associated with said roller for severing the strip between successive wafers, a cone forming mechanism, and means for transferring the severed wafers to said forming mechanism.

5. A machine for forming pastry cones comprising an annular baking unit having a horizontal circumferentially continuous bed and means for applying heat to material on said bed, means for continuously rotating said unit, means for dropping substantially equal masses of batter onto said bed at points regularly spaced circumferentially thereof to form wafers that are joined edge to edge in a continuous strip, strip lifting means including a roller extending radially over said bed and means for driving said roller at a peripheral speed that is substantially equal to the peripheral speed of the bed for lifting the leading end of said strip from the bed, means associated with said roller for severing the strip between successive wafers, a cone forming mechanism spaced radially from said baking unit, a track extending radially between said baking unit and said forming mechanism, a carriage on said track having wafer gripping means thereon, means for reciprocating said carriage during each interval between the severing of successive wafers from the strip to move said gripping means from a receiving position adjacent said severing means to a delivering position adjacent said forming means, and means controlled by movements of said carriage for opening the gripping means adjacent said forming mechanism to discharge a wafer and to close the gripping means on a wafer adjacent said severing means.

6. A machine for making pastry cones comprising a horizontal rotary baking unit, means for rotating said unit about a substantially vertical axis, means for delivering substantially uniform masses of batter to said unit to form wafers of substantially predetermined size, means for varying the volume of said masses to increase or decrease the wafer size, a cone forming machine spaced radially outwardly from said baking unit, a track extending from adjacent said baking unit to adjacent said forming mechanism, a carriage on said track, means for delivering wafers from said baking unit to said carriage, means for reciprocating said carriage in timed relation to the travel of said unit to transfer wafers to said forming mechanism, and means for adjusting the length of stroke of said carriage to accommodate wafers of different sizes.

7. A machine for making pastry cones comprising a horizontal rotary baking unit, means for rotating said unit, means for delivering substantially uniform masses of batter to said unit to form wafers of substantially predetermined size, means for varying the volume of said masses to increase or decrease the wafer size, a cone forming machine spaced radially outwardly from said baking unit, a track extending from adjacent said baking unit to adjacent said forming mechanism, a carriage on said track, means for delivering wafers from said baking unit to said carriage, means for reciprocating said carriage in timed relation to the travel of said unit to transfer wafers to said forming mechanism, and means for adjusting said track angularly to properly position the carriage at its limits of movement with respect to said baking unit and with respect to said forming mechanism.

8. A machine for making pastry cones comprising a horizontal rotary baking unit, means for rotating said unit, means for delivering substantially uniform masses of batter to said unit to form wafers of substantially predetermined size, means for varying the volume of said masses to increase or decrease the wafer size, a cone forming machine spaced radially outwardly from said baking unit, a track extending from adjacent said baking unit to adjacent said forming mechanism, a carriage on said track, means for delivering wafers from said baking unit to said carriage, means for reciprocating said carriage in timed relation to the travel of said unit to transfer wafers to said forming mechanism, means for adjusting the length of stroke of said carriage to accommodate wafers of different sizes, and means for laterally adjusting the end of said track adjacent the forming means.

9. A machine for making pastry cones comprising a horizontal rotary baking unit, means for rotating said unit, means for delivering substantially uniform masses of batter to said unit to form wafers of substantially predetermined size, means for varying the volume of said masses to increase or decrease the wafer size, a cone forming machine spaced radially outwardly from said baking unit, a track extending from adjacent said baking unit to adjacent said forming mechanism, a carriage on said track, means for delivering wafers from said baking unit to said carriage, means for reciprocating said carriage in timed relation to the travel of said unit to transfer wafers to said forming mechanism, means for adjusting the stroke of said carriage, and means for angularly adjusting the path of travel of said carriage.

10. A machine for making pastry cones comprising an annular baking unit having a horizontal circumferentially continuous bed and means for applying heat to material on said bed, means for delivering batter to said bed to form a continuous wafer strip thereon, means for rotating said unit, a radially extending elongated plate having its inner end over said bed, means for continuously lifting said strip from said bed and guiding the same onto the inner end of said plate, means between said bed and said plate for severing the wafers from said strip, a track alongside said plate, a carriage on said track having gripping means for engaging wafers resting on said plate, a cone forming mechanism adjacent the outer end of said track, means for reciprocating said carriage to transfer wafers from said severing means to said forming mechanism, and means for opening and closing said gripping means.

11. A machine for making pastry cones comprising an annular baking unit having a horizontal circumferentially continuous bed and means for applying heat to material on said bed, means for delivering batter to said bed to form a continuous wafer strip thereon, means for rotating said unit, means overlying said bed for lifting the leading end of the strip from said bed and for intermittently severing said strip along lines extending radially of said unit to provide wafers of uniform size, a radially extending track having its inner end over said bed and alongside said lifting and severing means, a cone forming mechanism adjacent the outer end of said track and on the side thereof opposite that facing said lifting and severing means, a carriage on said track, a wafer gripper on said carriage mounted to swing about a vertical axis, means controlled by movements of the carriage for opening and closing said gripper, and means controlled by movements of said carriage for swinging said gripper about said vertical axis to position the same for receiving a wafer from said lifting means and for delivering a wafer to said forming mechanism.

12. A machine for making pastry cones comprising an annular baking unit having a horizontal circumferentially continuous bed and means for applying heat to material on said bed, means for continuously rotating said unit, means in one quadrant of said unit for delivering batter to said bed to form a continuous wafer strip and for lifting the leading end of said strip from said bed, means operating at intervals timed with respect to the travel of said bed for severing wafers from said strip, a cone forming mechanism spaced radially outwardly from said baking unit, means for varying the rate of batter delivery to vary the wafer size, a wafer carrier operating in timed relation to the travel of said baking unit for transferring wafer from said severing means to said forming mechanism, and means for adjusting the path of travel of said carrier relative to said forming mechanism to accommodate wafers of different sizes.

13. A machine for making pastry cones comprising an annular baking unit having a horizontal circumferentially continuous bed and means for applying heat to material on said bed, means for continuously rotating said unit, means in one quadrant of said unit for delivering batter to said bed to form a continuous wafer strip and for lifting the leading end of said strip from said bed, means operating at intervals timed with respect to the travel of said bed for severing wafers from said strip, a cone forming mechanism spaced radially outwardly from said baking unit, a wafer carrier operating in timed relation to the travel of said baking unit for transferring wafers from said severing means to said forming mechanism, and means controlled by the portion of the wafer strip between said severing means and said bed for closing a signal circuit when the feed of the wafer strip to the lifting means is interrupted.

14. A machine of the character described comprising a baking unit of annular form having top and bottom heat conducting walls, said bottom wall being circumferentially continuous and said top wall being composed of sectors hinged at their outer ends to said bottom wall adjacent its outer periphery and movable from a position overlying said bottom wall to a position outwardly of said bottom wall, said sectors abutting edge to edge when overlying said bottom wall, each section having a projecting arm spaced from its hinge, means for rotating said unit, a cam track in the path of said arms having a horizontal arcuate central portion outwardly of said bottom wall and upwardly arched cam portions at opposite ends of said central portion engageable with said arms to swing said sectors from closed to open position and for returning the sectors to closed position, a conduit extending over the horizontal portion of said track for depositing batter on said bottom wall to form a continuous wafer strip, a cone forming mechanism spaced radially outwardly from said baking unit, means for lifting the leading end of said wafer strip from said bottom wall and means above the bottom wall for severing the said strip at uniform intervals to form tapering wafers, a radially disposed track extending from adjacent said forming mechanism across and above the central portion of said cam track to adjacent said severing means, a wafer carrier mounted for reciprocating movement on said track, and means for reciprocating said carrier in timed relation to the travel of said baking unit for transferring wafers from said severing means to said forming mechanism.

15. In a machine for making pastry cones comprising an annular baking unit having a horizontal circumferentially continuous bed and means for heating material on said bed, means for rotating said unit, a batter supply conduit having a delivery nozzle above said bed, means for intermittently discharging measured volumes of batter from said nozzle onto said bed to form rounded wafers joined edge to edge in a continuous strip, means including a radially extending roller above said bed for lifting the leading end of the wafer strip from said bed, and means for severing wafers from the leading end of said strip.

16. In a machine for making pastry cones comprising an annular baking unit having a horizontal circumferentially continuous bed and means for heating material on said bed, means for rotating said unit, means for delivering batter to said bed to form a continuous wafer strip, a frusto-conical roller extending radially over said bed and tapering toward the axis of said unit, means for driving said roller at a peripheral speed substantially equal to the speed of travel of said bed for lifting the leading end of said strip from said bed, and a cutter extending radially over said bed and intermittently engaging the strip passing over said roller to sever wafers from the leading end of said strip.

17. A machine for making pastry cones comprising an annular baking unit having a horizontal circumferentially continuous bed and means for heating material on said bed, means for rotating said unit, means for delivering batter to said bed to form a continuous wafer strip, a pair of frusto-conical rollers extending radially over said bed, said rollers being disposed one above the other with their axes oppositely inclined to provide between them a horizontal bight extending radially over said bed, the conical surfaces of revolution in which said roller surfaces lie tapering to points adjacent the axis of said unit, means for driving said rollers in opposite direction and each at a peripheral speed substantially equal to the speed of travel of the portions of the bed beneath it, and a cutter carried by one of said rollers and engageable with the wafer strip in said bight for severing wafers from said strip.

18. A machine for making pastry cones comprising an annular baking unit having a horizontal circumferentially continuous bed and means for heating material on said bed, means for rotating said unit, means for delivering batter to said bed to form a continuous wafer strip, a pair of frusto-conical rollers extending radially over said bed, said rollers being disposed one above the other with their axes oppositely inclined to provide between them a horizontal bight extending radially over said bed, the conical surfaces of revolution in which said roller surfaces lie tapering to points adjacent the axis of said unit, means for driving said rollers in opposite direction and each at a peripheral speed substantially equal to the speed of travel of the portions of the bed beneath it, a longitudinal radially projecting cutter blade carried by one of said rollers and engageable with the wafer strip in said bight to sever wafers from said strip, and a wafer engaging pin carried by one of said rollers and operable to advance the end of said strip into the bight after a wafer has been severed therefrom.

19. A machine for making pastry cones comprising an annular baking unit having a horizontal circumferentially continuous bed and means for heating material on said bed, means for rotating said unit, means for delivering batter to said bed to form a continuous wafer strip, a pair of frusto-conical rollers extending radially over said bed, said rollers being disposed one above the other with their axes oppositely inclined to provide between them a horizontal bight extending radially over said bed, the conical surfaces of revolution in which said roller surfaces lie tapering to points adjacent the axis of said unit, means for driving said rollers in opposite direction and each at a peripheral speed substantially equal to the speed of travel of the portions of the bed beneath it, a longitudinally extending radially projecting cutter blade carried by the upper of said rollers and engageable with the wafer strip in said bight to sever a wafer therefrom, and a pin carried by said upper roller and positioned to engage the wafer strip behind said blade to hold the end of the strip on the lower roller after a wafer is severed therefrom.

20. A machine of the character described comprising a baking annulus having top and bottom heat conducting walls and means for applying heat to said walls, said bottom wall being circumferentially continuous and said top wall being composed of sectors hinged at their outer ends to the bottom wall and each movable from a position overlying the bottom wall to a position outwardly of the bottom wall, said sectors abutting to form a circumferential top wall when overlying said bottom wall, means for turning said annulus about its axis, means acting upon said sectors to swing them about their hinges and hold them clear of said bottom wall during a portion of their travel to provide the said annulus with an arcuate closed baking zone and an arcuate open zone, means for depositing batter on said bottom wall in said open zone to form a continuous wafer strip, and means including a continuously driven stripping roller extending radially above said bottom wall in said open zone for lifting the baked wafer strip from said annulus.

21. A machine of the character described comprising a baking annulus having top and bottom heat conducting walls and means for applying heat to said walls, said bottom wall being circumferentially continuous and said top wall being composed of sectors hinged at their outer ends to the bottom wall and each movable from a position overlying the bottom wall to a position outwardly of the bottom wall, said sectors abutting to form a circumferential top wall when overlying said bottom wall, each of said sectors having an arm projecting radially from its free end, means for turning said annulus about its axis, a cam track having end portions arched over said bottom wall and an intermediate portion spaced outwardly of said bottom wall, said end portions extending into the path of said arms to swing said sectors to open position and to return the same to closed position, thereby providing said annulus with an arcuate baking zone and an arcuate open zone, means for depositing batter on said bottom wall in said open zone to form a continuous wafer strip, and a pair of rollers disposed above the annulus and having their axes radial of the baking annulus for feeding the leading end of the strip from said bottom wall, one of said rollers having a means for severing wafers from the strip along a line radial of the annulus.

22. A machine for making pastry cones comprising a baking mechanism having a horizontally disposed rotary wafer carrier, a cone forming mechanism spaced laterally of said carrier, a bed extending from above and adjacent said carrier to adjacent said forming mechanism, means for lifting wafers from said carrier and placing them on said bed, means for moving wafers along said bed comprising a carriage movable alongside said bed from a position adjacent said carrier to a position adjacent said forming mechanism, a gripper on said carriage, means adjacent said carrier engageable with said gripper to close the same on a wafer on said bed, and means adjacent said cone forming mechanism engageable with said gripper to open the same and to release a wafer.

23. A machine for making pastry cones comprising an annular baking unit having a horizontal circumferentially continuous bed and means for applying heat to material on the bed, means for rotating said unit, means including two radially spaced nozzles positioned over said bed for delivering batter to said bed, the outer of said nozzles being larger than the inner, means operating at intervals timed with respect to the rate of travel of said bed for delivering measured masses of batter of different volume through said nozzles to said bed to form radially elongated tapering wafers that are joined edge to edge in a continuous strip, means for lifting the leading end of said strip from said bed and for thereafter severing the individual wafers therefrom, a cone forming mechanism spaced laterally from said baking unit, a wafer carrier mounted for reciprocating movement between said severing means and said mechanism, and means for actuating said carrier in timed relation to the travel of said unit to deliver each wafer severed from said strip to said forming mechanism.

24. A machine for making pastry cones comprising a horizontally disposed rotary baking unit, means including radially spaced nozzles for delivering masses of batter of different volume onto said bed at points regularly spaced circumferentially thereof to form rounded wafers of tapering form having narrow edge portions and widened central portions therebetween, said edge portions being integrally joined to form a continuous strip of wafers, means for lifting the leading end of said strip from said bed, means for severing the tapered wafers from the strip at said narrow integrally joined edge portions, a cone forming mechanism having a wafer receiving station and a plurality of externally conical forming mandrels, means for moving said mandrels successively to said station, means for rotating each mandrel, and means for transferring wafers from said baking unit to said receiving station and for delivering each wafer sidewise to a mandrel with its small end adjacent the small end of the mandrel.

25. A machine for making pastry cones comprising an annular baking unit and means associated with said unit for forming wafers thereon of a form which tapers toward the axis of the baking unit, a cone forming mechanism having a rotatable externally conical mandrel, means for transferring wafers from said baking unit to said forming mechanism, and means for actuating said transfer mechanism to cause the wafer to be rotated angularly for more than 90° to deliver each wafer with its narrower end adjacent the small end of the mandrel.

26. A machine for making pastry cones comprising an annular making unit and means associated with said unit for forming wafers thereon of a form which tapers toward the axis of the baking unit, a cone forming mechanism having a wafer receiving station and a plurality of externally conical forming mandrels, means for moving said mandrels successively to said station, means for rotating each mandrel, means for transferring wafers from said baking unit to said receiving station, and means for actuating said transfer mechanism to cause the wafer to be rotated angularly for more than 90° to present each wafer with its narrower end adjacent the small end of the mandrel.

27. A machine for making pastry cones comprising an annular baking unit and means associated with said unit for forming wafers thereon of a form which tapers toward the axis of the baking unit, a cone forming mechanism having a wafer receiving station and a plurality of externally conical forming mandrels, means for moving said mandrels successively to said station, means for rotating each mandrel, means for transferring wafers from said baking unit to a forming mandrel including a wafer gripper, means for opening and closing said gripper, means for positioning said gripper at the receiving station of said forming mechanism, means for actuating said transfer mechanism to cause the wafer to be rotated angularly for more than 90° to deliver each wafer with its narrower end adjacent the small end of the mandrel, and means for adjusting the amount of angular turning of the gripper to properly position a lateral edge of the wafer with respect to the mandrel.

28. A machine of the character described comprising a baking unit of annular form having top and bottom heat conducting walls, said bottom wall being circumferentially continuous and said top wall being composed of sectors hinged at their outer ends to said bottom wall adjacent its outer periphery and movable from a position overlying said bottom wall to a position outwardly of said bottom wall, said sectors abutting edge to edge when overlying said bottom wall, means for rotating said unit, means acting upon said sectors for swinging them about their hinges to open positions outwardly of said bottom wall, holding them in their open positions during a portion of their travel and returning them to closed position to provide said annulus with an arcuate closed zone and an arcuate open zone, means for depositing batter on said bottom wall in said open zone to form a continuous wafer strip, means for heating said top and bottom walls in said closed zone to bake said strip, means overlying said bottom wall in said open zone for lifting the leading end of the batter strip from said bottom wall and severing the strip at regularly spaced intervals to form tapering wafers, a cone forming mechanism spaced radially outwardly from said open zone, and a carrier mounted to travel between said severing means and said forming mechanism for transferring the wafers from said severing means to said cone forming means, said carrier having means to rotate the wafer angularly more than 90° to present the narrower end of the tapered wafer to the cone forming mechanism so that the smaller edge of the wafer will form the pointed end of the cone, whereby the cone may be rolled with a minimum of overlap in the region of the apex of the cone.

References Cited in the file of this patent

UNITED STATES PATENTS

| Number | Name | Date |
| --- | --- | --- |
| 949,817 | Bates | Feb. 22, 1910 |
| 967,147 | Trewick | Aug. 9, 1910 |
| 1,164,566 | Aunes | Dec. 14, 1915 |
| 1,379,987 | Israel | May 31, 1921 |
| 1,652,375 | Sabbag | Dec. 13, 1927 |
| 1,804,039 | Tatosian | May 5, 1931 |
| 2,106,633 | Girodin | Jan. 25, 1938 |
| 2,321,634 | Tatosian | June 15, 1943 |
| 2,628,576 | Finke | Feb. 17, 1953 |